United States Patent
Zheng et al.

(10) Patent No.: US 12,537,020 B2
(45) Date of Patent: Jan. 27, 2026

(54) ROLE SEPARATION METHOD, MEETING SUMMARY RECORDING METHOD, ROLE DISPLAY METHOD AND APPARATUS, ELECTRONIC DEVICE, AND COMPUTER STORAGE MEDIUM

(71) Applicant: Alibaba Group Holding Limited, Grand Cayman (KY)

(72) Inventors: Siqi Zheng, Hangzhou (CN); Xianliang Wang, Hangzhou (CN); Hongbin Suo, Hangzhou (CN)

(73) Assignee: Alibaba Group Holding Limited, Grand Kayman (KY)

( * ) Notice: Subject to any disclaimer, the term of this patent is extended or adjusted under 35 U.S.C. 154(b) by 377 days.

(21) Appl. No.: 18/090,296

(22) Filed: Dec. 28, 2022

(65) Prior Publication Data

US 2023/0162757 A1   May 25, 2023

Related U.S. Application Data

(63) Continuation of application No. PCT/CN2021/101956, filed on Jun. 24, 2021.

(30) Foreign Application Priority Data

Jun. 28, 2020 (CN) .......................... 202010596049.3

(51) Int. Cl.
*G10L 25/78* (2013.01)
*G06F 21/32* (2013.01)
(Continued)

(52) U.S. Cl.
CPC .............. *G10L 25/78* (2013.01); *G06F 21/32* (2013.01); *G10L 17/02* (2013.01); *H04R 1/406* (2013.01)

(58) Field of Classification Search
CPC .................... G10L 25/78; G10L 17/02; G10L 2021/02166; G06F 21/32; H04R 1/406; H04R 2201/40; G06Q 10/10
See application file for complete search history.

(56) References Cited

U.S. PATENT DOCUMENTS 9,807,497 B2    10/2017  Nakadai
11,527,242 B2 * 12/2022  Wu ........................ G06V 40/20
(Continued)

FOREIGN PATENT DOCUMENTS

CN    203351200 U  * 12/2013  ......... G10L 21/0208
CN    105023572 A  * 11/2015  ............. G10L 21/00
(Continued)

OTHER PUBLICATIONS

English Translation of Chinese First Office Action for corresponding Chinese Application No. 202010596049.3 dated Jun. 22, 2023, 12 pages.

(Continued)

*Primary Examiner* — Paras D Shah
*Assistant Examiner* — Mulugeta Tuji Dugda
(74) *Attorney, Agent, or Firm* — Lee & Hayes, P.C.

(57) ABSTRACT

A role separation method, a meeting summary recording method, a role display method and apparatus, an electronic device, and a computer storage medium, relating to the field of speech processing. The role separation method comprises: obtaining sound source angle data corresponding to a speech data frame, acquired by a speech acquisition device, of a role to be separated (S102); on the basis of the sound source angle data, performing identity recognition on the role to be separated to obtain a first identity recognition result of the role to be separated (S104); and separating the role on the basis of the first identity recognition result of the (Continued)

role to be separated (S106). The role is separated in real time, thus making user experience smooth.

20 Claims, 18 Drawing Sheets

(51) Int. Cl.
    *G10L 17/02*     (2013.01)
    *H04R 1/40*     (2006.01)

(56) References Cited

U.S. PATENT DOCUMENTS

| | | | |
|---|---|---|---|
| 2015/0025888 A1* | 1/2015 | Sharp | G10L 17/00 704/246 |
| 2015/0082404 A1 | 3/2015 | Goldstein | |
| 2016/0021242 A1* | 1/2016 | Hodge | G06F 16/24575 379/189 |
| 2019/0115030 A1* | 4/2019 | Lesso | G01S 5/18 |
| 2019/0272844 A1* | 9/2019 | Sharma | G16H 50/70 |
| 2020/0077218 A1* | 3/2020 | Nakadai | G06N 7/01 |

FOREIGN PATENT DOCUMENTS

| | | | | |
|---|---|---|---|---|
| CN | 110062200 A | | 7/2019 | |
| CN | 110298252 A | | 10/2019 | |
| CN | 111048095 A | | 4/2020 | |
| CN | 111199741 A | | 5/2020 | |
| CN | 111260313 A | | 6/2020 | |
| EP | 2942975 A1 | * | 11/2015 | ............... G01S 1/72 |
| JP | 2016133304 A | * | 7/2016 | ............ H04R 1/406 |
| JP | 6589042 B1 | * | 10/2019 | ............ G10L 17/00 |
| KR | 20050035562 A | * | 4/2005 | ......... G06F 2218/22 |
| KR | 20110038447 B2 | * | 4/2011 | ............ G10L 15/20 |

OTHER PUBLICATIONS

English Translation of PCT Search Report dated Sep. 24, 2021 for corresponding PCT Application No. PCT/CN2021/101956 2 pages.
English Translation of PCT Written Opinion dated Sep. 24, 2021 for corresponding PCT Application No. PCT/CN2021/101956, 4 pages.
English Translation of Chinese First Search Report for corresponding Chinese Application No. 202010596049.3 dated Jun. 22, 2023, 2 pages.
English Translation of Chinese Second Office Action for corresponding Chinese Application No. 202010596049.3 dated Feb. 22, 2024, 7 pages.
Written Opinion for Singapore Application No. 11202261617P, dated Oct. 7, 2025, 6 pages.

* cited by examiner

```
┌─────────────────────────────────────────────────────────────┐
│ ACQUIRE SOUND SOURCE ANGLE DATA CORRESPONDING TO SPEECH DATA │
│  FRAME OF TO-BE-SEPARATED ROLE COLLECTED BY SPEECH COLLECTION│
│                           DEVICE                             │
│                            S102                              │
└─────────────────────────────────────────────────────────────┘
                              │
                              ▼
┌─────────────────────────────────────────────────────────────┐
│  PERFORM IDENTIFICATION ON TO-BE-SEPARATED ROLE BASED ON SOUND│
│ SOURCE ANGLE DATA TO OBTAIN FIRST IDENTIFICATION RESULT OF TO-BE-│
│                       SEPARATED ROLE                         │
│                            S104                              │
└─────────────────────────────────────────────────────────────┘
                              │
                              ▼
┌─────────────────────────────────────────────────────────────┐
│   SEPARATE ROLE BASED ON FIRST IDENTIFICATION RESULT OF TO-BE-│
│                       SEPARATED ROLE                         │
│                            S106                              │
└─────────────────────────────────────────────────────────────┘
```

FIG. 1A

SEND TO CLOUD ROLE SEPARATION REQUEST CARRYING SPEECH DATA FRAME OF TO-BE-SEPARATED ROLE, SO THAT CLOUD ACQUIRES SOUND SOURCE ANGLE DATA CORRESPONDING TO SPEECH DATA FRAME BASED ON ROLE SEPARATION REQUEST, PERFORMS IDENTIFICATION ON TO-BE-SEPARATED ROLE BASED ON SOUND SOURCE ANGLE DATA, AND SEPARATES ROLE BASED ON IDENTIFICATION RESULT OF TO-BE-SEPARATED ROLE
S301

RECEIVE SEPARATION RESULT OF ROLE SENT BY CLOUD BASED ON ROLE SEPARATION REQUEST
S302

FIG. 3A

ACQUIRE SOUND SOURCE ANGLE DATA CORRESPONDING TO SPEECH DATA FRAME OF MEETING ROLE COLLECTED BY SPEECH COLLECTION DEVICE DISPOSED IN MEETING ROOM
S502

PERFORM IDENTIFICATION ON MEETING ROLE BASED ON SOUND SOURCE ANGLE DATA TO OBTAIN IDENTIFICATION RESULT OF MEETING ROLE
S504

RECORD MEETING MINUTES OF MEETING ROLE BASED ON IDENTIFICATION RESULT OF MEETING ROLE
S506

FIG. 5

ROLE SEPARATION METHOD, MEETING SUMMARY RECORDING METHOD, ROLE DISPLAY METHOD AND APPARATUS, ELECTRONIC DEVICE, AND COMPUTER STORAGE MEDIUM

CROSS REFERENCE TO RELATED APPLICATIONS

This application claims priority to and is a continuation of PCT Patent Application No. PCT/CN2021/101956, filed on 24 Jun. 2021 and entitled "ROLE SEPARATION METHOD, MEETING SUMMARY RECORDING METHOD, ROLE DISPLAY METHOD AND APPARATUS, ELECTRONIC DEVICE, AND COMPUTER STORAGE MEDIUM," which claims priority to Chinese Patent Application No. 202010596049.3, filed on 28 Jun. 2020 and entitled "ROLE SEPARATION METHOD, MEETING SUMMARY RECORDING METHOD, ROLE DISPLAY METHOD AND APPARATUS, ELECTRONIC DEVICE, AND COMPUTER STORAGE MEDIUM," which are incorporated herein by reference in their entirety.

TECHNICAL FIELD

Embodiments of the present disclosure relate to the field of speech processing, and, more particularly, to methods, apparatuses, electronic devices and computer storage media for role separation, meeting minutes recording, and role display.

BACKGROUND

With the continuous development of information technology, the demand for high-precision information analysis is increasing. Calls or meetings based on electronic devices are an indispensable part of people's lives. Correspondingly, the recording and analysis of call content or meeting content has become a hotspot for researchers in relevant technical fields. For example, in the fields of public alarm calls, various hotlines, company meetings, etc., call content or meeting content can be recorded and analyzed, which can be further used to summarize and retrieve information at a later stage.

Role separation is an important step in meeting content analysis, and the real-time nature of the separation directly affects user experiences. Currently, role separation is mostly implemented based on voiceprint identification. Since voiceprint identification requires the accumulation of speech data for a certain length of time to guarantee high identification accuracy, most role separation systems based on voiceprint identification on the market are based on offline speech data to complete role separation, which is difficult to implement role separation in real time. How to separate a role in real time to improve user experiences has become a technical problem that needs to be solved urgently.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In light of the foregoing, the embodiments of the present disclosure provide a role separation solution to at least partially solve the above-mentioned technical problem.

According to an example embodiment of the present disclosure, a role separation method is provided. The method comprises: acquiring sound source angle data corresponding to a speech data frame of a to-be-separated role collected by a speech collection device; performing identification on the to-be-separated role based on the sound source angle data to obtain a first identification result of the to-be-separated role; and separating the role based on the first identification result of the to-be-separated role.

According to an example embodiment of the present disclosure, a role separation method is provided. The method comprises: sending to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role; and receiving a separation result of the role sent by the cloud based on the role separation request.

According to an example embodiment of the present disclosure, a role separation method is provided. The method comprises: receiving from a speech collection device a role separation request carrying a speech data frame of a to-be-separated role; acquiring sound source angle data corresponding to the speech data frame based on the role separation request; performing identification on the to-be-separated role based on the sound source angle data to obtain an identification result of the to-be-separated role; and separating the role based on the identification result of the to-be-separated role, and sending to the speech collection device a role separation result corresponding to the role separation request.

According to an example embodiment of the present disclosure, a meeting minutes recording method is provided. The method comprises: acquiring sound source angle data corresponding to a speech data frame of a meeting role collected by a speech collection device disposed in a meeting room; performing identification on the meeting role based on the sound source angle data to obtain an identification result of the meeting role; and recording meeting minutes of the meeting role based on the identification result of the meeting role.

According to an example embodiment of the present disclosure, a role display method is provided. The method comprises: acquiring sound source angle data corresponding to a speech data frame of a role collected by a speech collection device; performing identification on the role based on the sound source angle data to obtain an identification result of the role; and displaying identity data of the role on an interactive interface of the speech collection device based on the identification result of the role.

According to an example embodiment of the present disclosure, a role separation apparatus is provided. The apparatus comprises: a first acquisition module, configured to acquire sound source angle data corresponding to a speech data frame of a to-be-separated role collected by a speech collection device; a first identification module, configured to perform identification on the to-be-separated role based on the sound source angle data to obtain a first identification result of the to-be-separated role; and a separation module, configured to separate the to-be-separated role based on the first identification result of the to-be-separated role.

According to an example embodiment of the present disclosure, a role separation apparatus is provided. The apparatus comprises: a first sending module, configured to send to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role; and a first receiving module, configured to receive a separation result of the role sent by the cloud based on the role separation request.

According to an example embodiment of the present disclosure, a role separation apparatus is provided. The apparatus comprises: a second receiving module, configured to receive from a speech collection device a role separation request carrying a speech data frame of a to-be-separated role; a third acquisition module, configured to acquire sound source angle data corresponding to the speech data frame based on the role separation request; a second identification module, configured to perform identification on the to-be-separated role based on the sound source angle data to obtain an identification result of the to-be-separated role; and a second sending module, configured to separate the role based on the identification result of the to-be-separated role, and send to the speech collection device a role separation result corresponding to the role separation request.

According to an example embodiment of the present disclosure, a meeting minutes recording apparatus is provided. The apparatus comprises: a fourth acquisition module, configured to acquire sound source angle data corresponding to a speech data frame of a meeting role collected by a speech collection device disposed in a meeting room; a third identification module, configured to perform identification on the meeting role based on the sound source angle data to obtain an identification result of the meeting role; and a recording module, configured to record meeting minutes of the meeting role based on the identification result of the meeting role.

According to an example embodiment of the present disclosure, a role display apparatus is provided. The apparatus comprises: a fifth acquisition module, configured to acquire sound source angle data corresponding to a speech data frame of a role collected by a speech collection device; a fourth identification module, configured to perform identification on the role based on the sound source angle data to obtain an identification result of the role; and a first display module, configured to display identity data of the role on an interactive interface of the speech collection device based on the identification result of the role.

According to an example embodiment of the present disclosure, an electronic device is provided, comprising: a processor, a memory, a communications interface, and a communications bus, wherein the processor, the memory, and the communications interface communicate with each other through the communications bus; the memory is configured to store at least one executable instruction that causes the processor to execute an operation corresponding to the role separation method according to the first, second, or third aspect, or an operation corresponding to the meeting minutes recording method according to the fourth aspect, or an operation corresponding to the role display method according to the fifth aspect.

According to an example embodiment of the present disclosure, a computer storage medium having a computer program stored thereon is provided, wherein the program, when executed by a processor, is caused to implement the role separation method according to the first, second, or third aspect, or the meeting minutes recording method according to the fourth aspect, or the role display method according to the fifth aspect.

The role separation solution provided according to the embodiments of the present disclosure comprises acquiring sound source angle data corresponding to a speech data frame of a to-be-separated role collected by a speech collection device; performing identification on the to-be-separated role based on the sound source angle data to obtain a first identification result of the to-be-separated role; and separating the role based on the first identification result of the to-be-separated role. By performing identification on the to-be-separated role based on the sound source angle data corresponding to the speech data frame of the to-be-separated role collected by the speech collection device and separating the role based on the identification result of the to-be-separated role, the solution can separate the role in real time, thereby creating smoother user experiences than existing other solutions in the conventional techniques.

BRIEF DESCRIPTION OF DRAWINGS

In order to describe the technical solutions more clearly in the embodiments of the present disclosure, the following briefly describes the accompanying drawings needed for describing the embodiments. Apparently, the accompanying drawings described below only show some, instead of all, of the embodiments of the present disclosure, and those of ordinary skill in the art may derive other accompanying drawings therefrom.

FIG. 1A is a flowchart of the steps of a role separation method provided in a first embodiment of the present disclosure;

FIG. 3A is a flowchart of the steps of a role separation method provided in a third embodiment of the present disclosure;

FIG. 5 is a flowchart of the steps of a meeting minutes recording method provided in a fifth embodiment of the present disclosure;

DESCRIPTION OF EMBODIMENTS

Figure 1B:
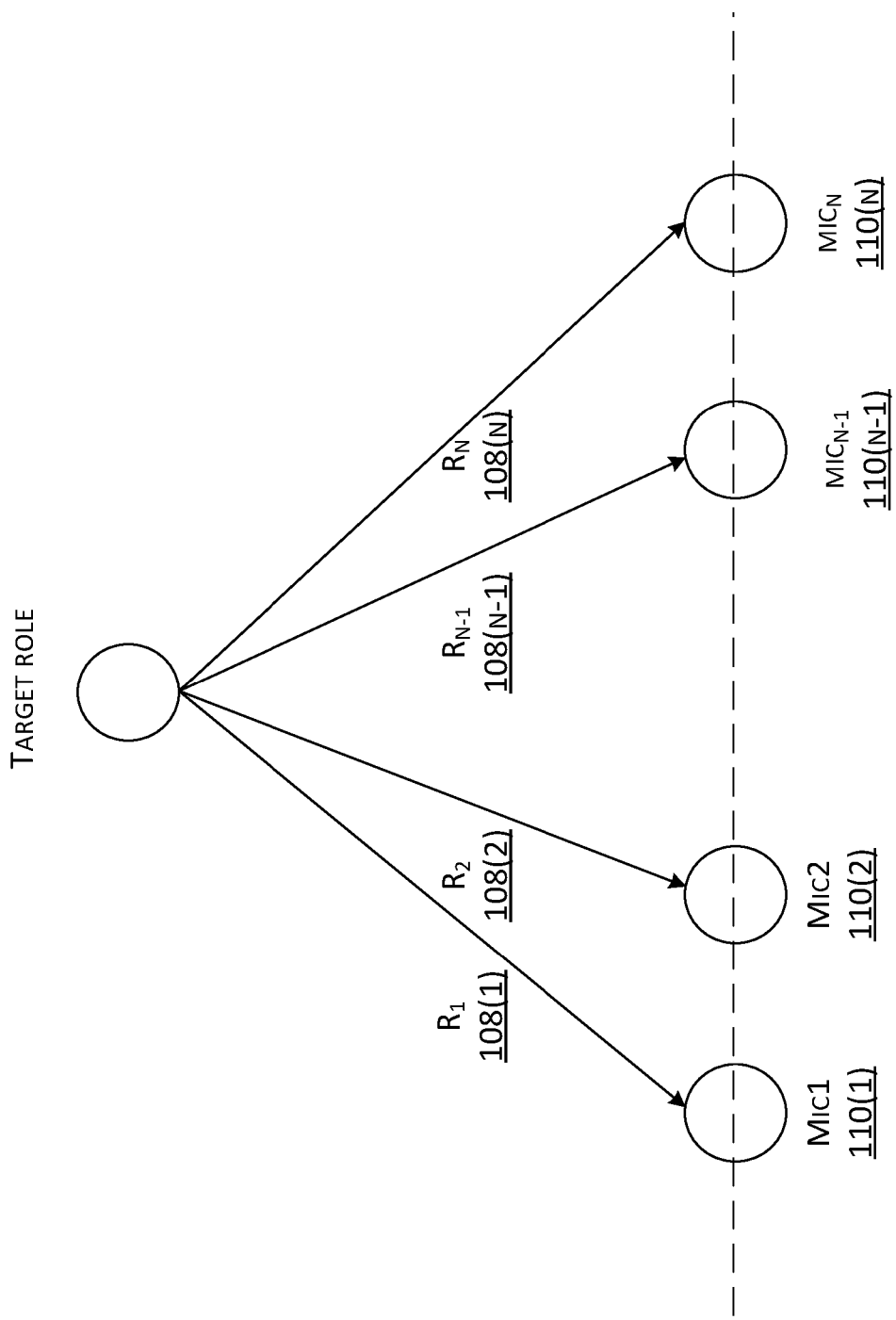
FIG. 1B is a schematic diagram of sound propagation in a near-field model provided in the first embodiment of the present disclosure.

In order to enable those skilled in the art to better understand the technical solution in the embodiments of the present disclosure, the technical solution in the embodiments of the present disclosure will be clearly and completely described below with reference to the accompanying drawings in the embodiments of the present disclosure. Obviously, the described embodiments are merely some but not all of the embodiments of the present disclosure. Based on the embodiments of the present disclosure, all other embodiments obtained by those of ordinary skill in the art shall fall within the protection scope of the embodiments of the present disclosure.

The implementation of the embodiments of the present disclosure will be further illustrated with reference to the accompanying drawings of the embodiments of the present disclosure.

Referring to FIG. 1A, it shows a flowchart of the steps of a role separation method provided in a first embodiment of the present disclosure.

For example, the role separation method provided in this embodiment comprises the following steps:

Step S102: acquire sound source angle data corresponding to a speech data frame of a to-be-separated role collected by a speech collection device.

In this embodiment of the present disclosure, the speech collection device may comprise a pickup. The to-be-separated role may be a to-be-separated meeting role, a to-be-separated caller, or the like. The speech data frame may be understood as a speech fragment with a duration of 20-30 milliseconds. The sound source angle data may be understood as the angle of the to-be-separated role relative to the speech collection device when speaking. It can be understood that the above description is exemplary only, which is not limited by this embodiment of the present disclosure.

In some example embodiments, the speech collection device comprises a microphone array. When acquiring the sound source angle data corresponding to the speech data frame of the to-be-separated role collected by the speech collection device, acquire a covariance matrix of the speech data frame received by at least some microphones in the microphone array; perform eigenvalue decomposition on the covariance matrix to obtain multiple eigenvalues; select a first quantity of largest eigenvalues from the multiple eigenvalues, and form a speech signal sub-space based on eigenvectors corresponding to the selected eigenvalues, wherein the first quantity is equivalent to an estimated quantity of sound sources; and determine the sound source angle data based on the speech signal sub-space. It can be understood that the above description is exemplary only, which is not limited by this embodiment of the present disclosure.

For example, the microphone array may be set up on a device (such as the pickup) that supports speech interaction to receive nearby sound inputs. The microphone array is formed by a set of omnidirectional microphones at different locations in space and arranged in a certain shape. It is an apparatus for spatial sampling of spatially propagated sound inputs, and the collected signal contains its spatial location information. Depending on the topology of the microphone array, it can be divided into a linear array, a planar array, a 3D array, and the like. Depending on the distance between a sound source and the microphone array, the array can be divided into a near-field model and a far-field model. The near-field model regards a sound wave as a spherical wave, which considers the amplitude difference between the received signals of the microphone array elements; while the far-field model regards a sound wave as a plane wave, which ignores the amplitude difference between the received signals of the microphone array elements, and approximates a simple time-delay relationship between the received signals. Sound source localization may be performed according to signals received by at least some microphones in the microphone array to determine the location information of the role. The determined location information may be the two-dimensional coordinates of the role's location or the azimuth and distance of the role relative to the at least some microphones. Here, the azimuth is the role's azimuth in the coordinate system where the at least some microphones are located, that is, the sound source angle data, and the distance is the distance between the role and the center position of the at least some microphones. As an example, according to signals received by some or all microphones in the microphone array, a multiple signal classification (MUSIC) algorithm may be used to perform sound source localization. The basic idea of the MUSIC algorithm is to perform eigenvalue decomposition on the covariance matrix of the output data of any array, so as to obtain a signal sub-space corresponding to the signal component and a noise sub-space orthogonal to the signal component, and then use the orthogonality of these two sub-spaces to estimate the parameters of the signal (incidence direction, polarization information, and signal strength). For example, the orthogonality of these two sub-spaces can be used to form a spatial scanning spectrum, and a global search for spectral peaks can be performed, thereby realizing the parameter estimation of the signal.

Taking a microphone array applied to a pickup as an example, the microphone array can be a linear array, and the sound field model can be regarded as a near-field model. In the near field, the time difference between the sound source signals reaching each microphone in the microphone array is $\tau$, which, compared with that in the far field, changes not only with the angle but also with the distance. As shown in FIG. 1B, assuming the distances from the to-be-separated role to each microphone such as $MIC_1$ 108(1), $MIC_2$ 108(2), . . . , $MIC_{N-1}$ 108(n-1), $MIC_N$, 108(n) in the microphone array are $R_1$ 110(1), $R_2$ 110(2), . . . , $R_{N-1}$ 110(n-1), $R_N$ 110(n) respectively, and the propagation speed of sound waves in the air is C, then the time difference between the sound waves reaching the i-th microphone and reaching the first microphone is $\tau_i$, wherein $$\tau_i = \frac{R_i - R_1}{C}$$

n may be any integer. The sound source localization process in the near-field model is described as follows.

First, a covariance matrix of the signals received by at least some microphones in the microphone array is acquired. For example, the covariance matrix can be expressed as R(f), and $R(f)=E[X(f)X(f)^H]$, wherein X(f) is the data of the signals received by the at least some microphones in the microphone array at different frequency points f after the signals are subjected to Fourier transform (e.g., short-time Fourier transform), which is frequency domain data. X(f) can be regarded as a vector, and each element in the vector represents the data of the signal received by a microphone at different frequency points f after the Fourier transform. For example, X(f) can be expressed as $X(f)=\{X_1(f), X_2(f) \ldots X_M(f)\}$ Here, X1(f), X2(f) . . . XM(f) represent the data of the signals received by different microphones at different frequency points f after the signals are subjected to Fourier transform (e.g., short-time Fourier transform), and M is the number of microphones. In fact, a time variable t is implied in the expression of X(f), and the complete representation should be X(f, t), which represents the data contained in the time period t. E represents the mathematical expectation and, to solve the mathematical expectation or mean, actually for the time period t, it can be understood as $E[X(f, t) X(f, t)^H]$, or $$\frac{1}{N2-N1}\sum_{k=N1}^{N2} X(f, t),$$

wherein N2–N1 represents the time period corresponding to X(f, t), N1 represents the start time, and N2 represents the end time.

Then, eigenvalue decomposition is performed on the covariance matrix to obtain multiple eigenvalues. A first quantity of largest eigenvalues can be selected from the multiple eigenvalues, and a signal sub-space can be formed based on eigenvectors corresponding to the selected eigenvalues. Eigenvectors corresponding to the remaining eigenvalues can form a noise sub-space, wherein the first quantity is equivalent to an estimated quantity of sound sources. For example, when it is considered that there are three sound source signals, eigenvectors corresponding to three largest eigenvalues can be selected to form the signal sub-space. The estimated quantity of sound sources can be calculated according to experiences or other estimation methods, which will not be elaborated herein. For example, after being subjected to eigenvalue decomposition, $R(f)=U_s(f)\Sigma_s U_s(f)^H + U_N(f)\Sigma_N U_N(f)^H$, wherein Us(f) is the signal sub-space formed by eigenvectors corresponding to large eigenvalues, $U_N(f)$ is the noise sub-space formed by eigenvectors corresponding to small eigenvalues, S and N represent different divisions of the signal U, S stands for signal, N stands for noise, the divided Us represents the signal sub-space, and the divided $U_N$ represents the noise sub-space. Σ represents a diagonal matrix consisting of eigenvalues. In fact, after being subjected to eigenvalue decomposition, $R(f)=U(f)\Sigma U(f)^H$, wherein Σ is a matrix only with main diagonal elements, the main diagonal elements in Σ are the eigenvalues obtained by decomposition, and according to the size of the main diagonal elements (eigenvalues) in Σ, U and Σ can be divided into a large category S (namely the signal sub-space formed by eigenvectors corresponding to large eigenvalues), and a small category N (namely the noise sub-space formed by eigenvectors corresponding to remaining small eigenvalues), then $R(f)=U_s(f)\Sigma_s U_s(f)^H + U_N(f)\Sigma_N U_N(f)^H$.

Based on the signal sub-space, the sound source location can be determined. For example, the maximum response of the signal in a two-dimensional space can be determined based on the signal sub-space, and based on the direction of arrival (DOA) corresponding to the maximum response, the sound source location, that is, the location information of the role, can be determined.

As an example, the calculation formula of a response of a target signal in a two-dimensional space is:

$$S_{R,\theta} = \sum_j a^H(R, \theta, f) U_s(f) U_s(f)^H a(R, \theta, f)$$

f is a value range, and a(R,θ,f) can be obtained based on the relative time difference τ. Here, a(R,θ,f) represents the steering vector of the microphone array. R is the distance between the sound source and the center of the microphone array, and θ is the azimuth of the sound source in the coordinate system of the microphone array. Assuming the sound source is located at (R,θ), the relative time difference τ is defined as the difference of the time needed for the sound source to reach each microphone relative to the time needed for the sound source to reach the first microphone, $\tau=(\tau_1, \tau_2 \ldots \tau_M)$, and $\tau_1=0$, then the steering vector $a(R,\theta,f)=(a_1, a_2, \ldots, a_M)$ of the corresponding location (R,θ) at the frequency f can be obtained, wherein $a_i = e^{-2\pi/\tau_i}$. The two-dimensional coordinates of the to-be-separated role are $(R_{target}, \theta_{target})=\text{argmax}(R,\theta)S_{R,\theta}$. In other words, when the response $S_{R,\theta}$ is the largest, (R, θ) is the location of the to-be-separated role. It can be understood that the above description is exemplary only, which is not limited by this embodiment of the present disclosure.

In some example embodiments, after acquiring the sound source angle data corresponding to the speech data frame of the to-be-separated role collected by the speech collection device, the method further comprises: performing voice activity detection on the speech data frame of the to-be-separated role to obtain a speech data frame with a voice activity; filtering and smoothing the speech data frame with the voice activity based on an energy spectrum of the speech data frame of the to-be-separated role to obtain a filtered and smoothed speech data frame; and updating the sound source angle data based on the filtered and smoothed speech data frame to obtain updated sound source angle data. In this way, by performing voice activity detection, and filtering and smoothing on the speech data frame of the to-be-separated role, more stable sound source angle data can be obtained. It can be understood that the above description is exemplary only, which is not limited by this embodiment of the present disclosure.

In an example, voice activity detection (VAD), also known as speech activity detection, is to determine the start and end points of a speech from a signal containing the speech, and then extract the corresponding non-silent speech signal, thereby eliminating the interference of silent segments and non-speech signals, so that the processing quality is guaranteed. In addition, efficient activity detection can minimize the processing time. The voice activity detection performed on the speech data frame of the to-be-separated role may be based on spatial entropy or based on a neural network model. Here, the voice activity detection based on spatial entropy proceeds as follows: since the sound signal received by the microphone array may contain the sound of the to-be-separated role and the surrounding environmental noise, the voice activity detection may be performed according to the degree of chaos in the signal space of the sound signal received by at least some microphones in the microphone array. In this embodiment, the degree of chaos of the signal space can be characterized by spatial entropy. If the spatial entropy is small, it can be considered that a voice activity exists; and if the spatial entropy is large, it can be considered that no voice activity exists. As an example, a covariance matrix of the signals received by at least some microphones in the microphone array may be acquired first, and then eigenvalue decomposition is performed on the covariance matrix to obtain multiple eigenvalues. As described above, the signal sub-space formed by large eigenvalues may be considered as the speech sub-space, and the signal sub-space formed by small eigenvalues may be considered as the noise sub-space. Therefore, whether a voice activity exists or not may be determined by analyzing the multiple eigenvalues. If each eigenvalue can be considered as a signal sub-space (i.e., a signal source), the entropy (i.e., the spatial entropy) of the multiple eigenvalues can be calculated, and whether a voice activity exists or not can be determined based on the size of the calculated spatial entropy. For example, the multiple eigenvalues can be normalized, and the spatial entropy of multiple values obtained after normalization can be calculated. By comparing the spatial entropy with a predetermined threshold, whether a voice activity exists or not can be determined based on the comparison result. For example, if the spatial entropy is smaller than the predetermined threshold, it can be determined that a voice activity exists; and if the spatial entropy is larger or equal to the predetermined threshold, it can be determined that no voice activity exists. Here, the predetermined threshold can be set according to the actual situation. For example, it can be related to a selected localization frequency band. For example, when the localization frequency band is 500-5000 (Hz), the predetermined threshold can be 1. When the space entropy is less than 1, it can be determined that a voice activity exists; otherwise, it can be determined that it is noise and no voice activity exists. Here, the space entropy is ES, $$ES=-\Sigma_{i=1}^{N} p_i \log(p_i),$$

$p_i$ is the value obtained after an eigenvalue is normalized, N is the quantity of eigenvalues obtained after the covariance matrix is subjected to eigenvalue decomposition, and the base number of the log is a value greater than 1, such as 2, 10, and e, which is not limited herein. Here, the voice activity detection based on a neural network model proceeds as follows: a voice activity detection model can be used to predict the speech data frame acquired based on at least some microphones in the microphone array to determine whether a voice activity exists or not. Here, the voice activity detection model is used to predict the voice activity state of the input speech data frame, which may be a neural network-based model, and the prediction model may be obtained by supervised machine learning. It can be understood that the above description is exemplary only, which is not limited by this embodiment of the present disclosure.

In some example embodiments, when filtering and smoothing the speech data frame with the voice activity based on an energy spectrum of the speech data frame of the to-be-separated role to obtain a filtered and smoothed speech data frame, filter and smooth the speech data frame with the voice activity through a median filter based on spectral flatness of the energy spectrum of the speech data frame of the to-be-separated role to obtain the filtered and smoothed speech data frame. In this way, by filtering and smoothing the speech data frame with the voice activity through the median filter based on the spectral flatness of the energy spectrum of the speech data frame of the to-be-separated role, the filtering and smoothing effect for the speech data frame with the voice activity can be effectively improved. It can be understood that the above description is exemplary only, which is not limited by this embodiment of the present disclosure.

In an example, median filtering is a non-linear digital filtering technique that is often used to remove noise from images or other signals. The median filter is designed to check a sample of an input signal and determine if it represents the signal. An observation window formed by an odd quantity of samples is used to achieve this function. The values in the observation window are sorted, with the median in the middle of the observation window as the output. Then, the oldest value is discarded, a new sample is taken, and the above calculation process is repeated. The spectral flatness of the energy spectrum of the speech data frame of the to-be-separated role can be understood as the flatness of the energy spectrum of the speech data frame of the to-be-separated role, which is a characteristic parameter of the energy spectrum. By calculating the energy spectrum of the speech data frame of the to-be-separated role, the flatness of the energy spectrum of the speech data frame of the to-be-separated role can be obtained. When filtering and smoothing the speech data frame with the voice activity through the median filter based on the spectral flatness of the energy spectrum of the speech data frame of the to-be-separated role, filter and smooth the energy spectrum of the speech data frame with the voice activity through the median filter based on the spectral flatness of the energy spectrum of the speech data frame of the to-be-separated role to obtain a filtered and smoothed energy spectrum; and determine the filtered and smoothed speech data frame based on the filtered and smoothed energy spectrum. It can be understood that the above description is exemplary only, which is not limited by this embodiment of the present disclosure.

In some example embodiments, when updating the sound source angle data based on the filtered and smoothed speech data frame, acquire sound source angle data corresponding to the filtered and smoothed speech data frame; and use the sound source angle data corresponding to the filtered and smoothed speech data frame to update the sound source angle data corresponding to the speed data frame of the to-be-separated role. Here, the implementation manner of acquiring sound source angle data corresponding to the filtered and smoothed speech data frame is similar to that of acquiring sound source angle data corresponding to a speech data frame of a to-be-separated role collected by a speech collection device described above, and will not be elaborated herein. It can be understood that the above description is exemplary only, which is not limited by this embodiment of the present disclosure.

Step S104: perform identification on the to-be-separated role based on the sound source angle data to obtain a first identification result of the to-be-separated role.

In some example embodiments, when performing identification on the to-be-separated role based on the sound source angle data to obtain a first identification result of the to-be-separated role, perform sequence clustering on the sound source angle data to obtain a sequence clustering result of the sound source angle data; and determine that a role identifier corresponding to the sequence clustering result of the sound source angle data is the first identification result of the to-be-separated role. Here, the role identifier may be a name, a nickname, an identity code, or the like of the role. In this way, by performing sequence clustering on the sound source angle data, the first identification result of the to-be-separated role can be accurately obtained. It can be understood that the above description is exemplary only, which is not limited by this embodiment of the present disclosure.

In an example, sequence clustering is typically a non-supervised method for classifying data in a certain quantity of homogeneous data sets (or clusters). In this case, the quantity of clusters is not predetermined, but is gradually increased in sequence (one after the other) according to given criteria until an appropriate stop condition is met. A sequence clustering algorithm has two advantages. First, it avoids unnecessary redundant calculations of a large quantity of clusters. Second, the clusters are usually extracted in sequence from the most important cluster (with the largest capacity) to the least important cluster (with the smallest capacity). When performing sequence clustering on the sound source angle data to obtain a sequence clustering result of the sound source angle data, determine a distance between the sound source angle data and a sound source angle sequence clustering center; and determine the sequence clustering result of the sound source angle data based on the distance between the sound source angle data and the sound source angle sequence clustering center. Here, the sound source angle sequence clustering center may be understood as the central angle of each sequence clustering of the sound source angle. For example, assuming there are three sequence clusterings of the sound source angle, then the central angles of the three sequence clusterings of the sound source angle may be 30 degrees, 60 degrees, or 90 degrees. When determining the distance between the sound source angle data and the sound source angle sequence clustering center, determine that the absolute value of the difference between the sound source angle data and the sound source angle sequence clustering center is the distance between the sound source angle data and the sound source angle sequence clustering center. When determining the sequence clustering result of the sound source angle data based on the distance between the sound source angle data and the sound source angle sequence clustering center, compare the distance between the sound source angle data and the sound source angle sequence clustering center with a preset distance threshold: if the distance between the sound source angle data and the sound source angle sequence clustering center is less than the preset distance threshold, determine that the sequence clustering result of the sound source angle data is a sequence clustering where the sound source angle sequence clustering center is located; and if the distance between the sound source angle data and the sound source angle sequence clustering center is equal to or greater than the preset distance threshold, determine that the sequence clustering result of the sound source angle data is not a sequence clustering where the sound source angle sequence clustering center is located. It can be understood that the above description is exemplary only, which is not limited by this embodiment of the present disclosure.

Step S106: separate the role based on the first identification result of the to-be-separated role.

In this embodiment of the present disclosure, after the first identification result of the to-be-separated role is obtained, the first identification result of the to-be-separated role can be used to distinguish the to-be-separated role, thereby achieving the separation of the to-be-separated role. It can be understood that the above description is exemplary only, which is not limited by this embodiment of the present disclosure.

Figure 1C:
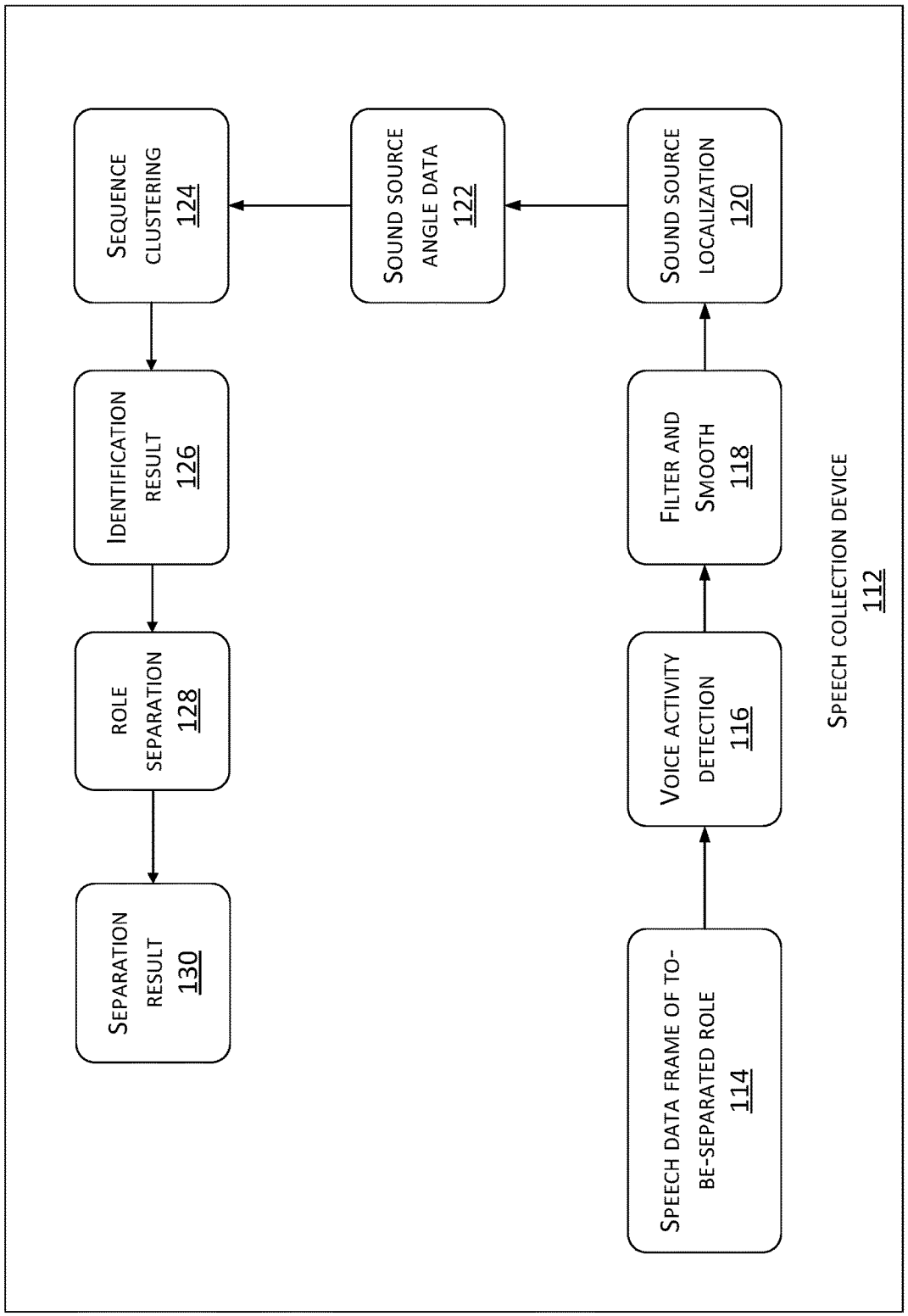
FIG. 1C is a schematic diagram of the scene of the role separation method provided in the first embodiment of the present disclosure.

In an example, as shown in FIG. 1C, the speech data frame of the to-be-separated role is collected by a speech collection device 112. After the speech data frame of the to-be-separated role 114 is collected by the speech collection device 112, the following steps are performed: perform voice activity detection 116 on the speech data frame of the to-be-separated role to obtain a speech data frame with a voice activity; filter and smooth 118 the speech data frame with the voice activity based on an energy spectrum of the speech data frame of the to-be-separated role to obtain a filtered and smoothed speech data frame; perform sound source localization 120 on the filtered and smoothed speech data frame to determine sound source angle data 122; perform sequence clustering 124 on the sound source angle data to obtain a sequence clustering result of the sound source angle data; determine that a role identifier corresponding to the sequence clustering result of the sound source angle data is an identification result 126 of the to-be-separated role; and finally perform the role separation 128 based on the identification result of the to-be-separated role to obtain the separation result 130. It can be understood that the above description is exemplary only, which is not limited by this embodiment of the present disclosure.

By the role separation method provided in this embodiment of the present disclosure, acquire sound source angle data corresponding to a speech data frame of a to-be-separated role collected by a speech collection device; perform identification on the to-be-separated role based on the sound source angle data to obtain a first identification result of the to-be-separated role; and separate the role based on the first identification result of the to-be-separated role. By performing identification on the to-be-separated role based on the sound source angle data corresponding to the speech data frame of the to-be-separated role collected by the speech collection device, and separating the role based on the identification result of the to-be-separated role, the method can separate the role in real time, thereby creating smoother user experiences than existing methods in the conventional techniques.

The role separation method provided in this embodiment can be executed by any suitable device with data processing capability, which includes but is not limited to cameras, terminal devices, mobile terminals, PCs, servers, vehicle-mounted devices, entertainment devices, advertising devices, personal digital assistants (PDAs), tablets, laptops, handheld game consoles, smart glasses, smart watches, wearable devices, virtual display devices, augmented reality display devices, etc.

Figure 2A:
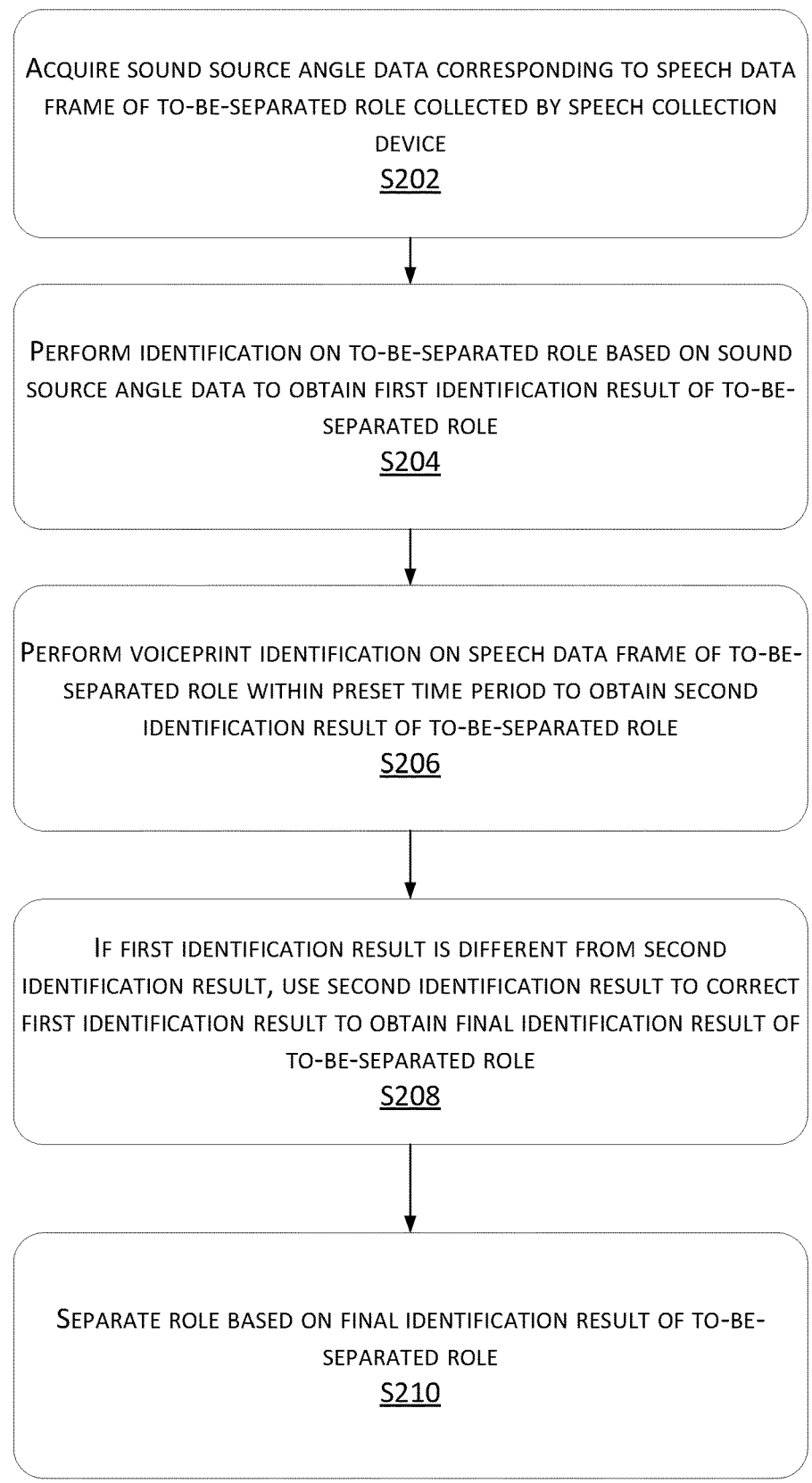
FIG. 2A is a flowchart of the steps of a role separation method provided in a second embodiment of the present disclosure.

Referring to FIG. 2A, it shows a flowchart of the steps of a role separation method provided in a second embodiment of the present disclosure.

For example, the role separation method provided in this embodiment comprises the following steps:

Step S202: acquire sound source angle data corresponding to a speech data frame of a to-be-separated role collected by a speech collection device.

Since the implementation manner of this step S202 is similar to that of the above-described step S102, it will not be elaborated herein.

Step S204: perform identification on the to-be-separated role based on the sound source angle data to obtain a first identification result of the to-be-separated role.

Since the implementation manner of this step S204 is similar to that of the above-described step S104, it will not be elaborated herein.

Step S206: perform voiceprint identification on a speech data frame of the to-be-separated role within a preset time period to obtain a second identification result of the to-be-separated role.

In this embodiment of the present disclosure, voiceprint refers to a sound wave spectrum carrying speech information in a human speech, which has unique biological features and the function of identification. Voiceprint identification, also known as role identification, is a biometric technology that extracts speech features from a speech signal sent by a role and authenticates the role accordingly. The process of voiceprint identification usually proceeds as follows: pre-store the voiceprint information of one or some users (the user whose voiceprint information is stored is a registered user); compare a speech feature extracted from a role's speech signal with the pre-stored voiceprint to obtain a similarity score; and then compare the score with a threshold: if the score is greater than the threshold, the role is considered to be the registered user corresponding to the voiceprint; and if the score is less than or equal to the threshold, the role is not considered to be the registered user corresponding to the voiceprint. The preset time period may be set by those skilled in the art according to actual requirements, which is not limited by this embodiment of the present disclosure. It can be understood that the above description is exemplary only, which is not limited by this embodiment of the present disclosure.

In an example, the speech data frame of the to-be-separated role within the preset time period may undergo different levels of preprocessing before voiceprint identification. Such preprocessing can facilitate more efficient voiceprint identification. In various implementation manners, the preprocessing may comprise: sampling; quantification; removing non-speech audio data and silent audio data; framing and windowing audio data containing a speech for subsequent processing, and the like. After preprocessing, a speech feature of the speech data frame of the to-be-separated role in the preset time period can be extracted, and based on the speech feature of the speech data frame, a matching operation can be performed between the speech data frame and a user's voiceprint. The speech feature may be one of a Filter Bank (FBank), a Mel Frequency Cepstral Coefficient (MFCC), a Perceptual Linear Prediction Coefficient (PLP), a Deep Feature, and a Power Normalized Cepstral Coefficient (PNCC), or a combination thereof. In an embodiment, the extracted speech feature may also be normalized. Then, based on the speech feature of the speech data frame, a matching operation is performed between the speech data frame and a user's voiceprint to obtain a similarity score between the speech data frame and the user's voiceprint, and based on the similarity score, the user matching with the speech data frame is determined. For example, in some implementation manners, the user's voiceprint is described with a voiceprint model, such as a hidden Markov model (HMM model), a Gaussian mixture model (GMM model), and the like. The user's voiceprint model is characterized by a speech feature and is obtained by training using audio data containing the user's speech (hereinafter referred to as the user's audio data). A matching operation function may be used to calculate the similarity between the speech data frame and the user's voiceprint. For example, the posterior probability that the speech feature of the speech data frame matches the user's voiceprint model can be calculated as the similarity score, and the likelihood between the speech feature of the speech data frame and the user's voiceprint model can also be calculated as the similarity score. However, since training the user's voiceprint model requires a large amount of the user's audio data, in some implementation manners, the user's voiceprint model can be obtained by training with a small amount of the user's audio data based on a user-independent universal background model (also characterized by a speech feature). For example, user-independent audio data of multiple roles can be used first to obtain a universal background model (UBM) by training with an expectation-maximization (EM) algorithm, so as to represent user-independent feature distribution. Then, based on the UBM model, a small amount of the user's audio data is used to obtain a GMM model by training with an adaptive algorithm (such as maximum a posteriori (MAP) probability and maximum-likelihood linear regression (MLLR)) (the GMM model obtained in this way is called a GMM-UBM model) to represent the user's feature distribution. The GMM-UBM model is the user's voiceprint model. At this point, based on the speech feature of the speech data frame, a matching operation may be performed between the speech data frame and the user's voiceprint model and the universal background model respectively to obtain a similarity score between the speech data frame and the user's voiceprint. For example, calculate the likelihoods between the speech feature of the speech data frame and the above-mentioned UBM model and GMM-UBM model respectively, then divide the two likelihoods and take the logarithm, and use the obtained value as the similarity score between the speech data frame and the user's voiceprint.

In other implementation manners, the user's voiceprint is described with a voiceprint vector, such as i-vector, d-vector, x-vector, j-vector, and so on. The voiceprint vector of the speech data frame may be extracted at least based on the speech feature of the speech data frame. According to an embodiment, a voiceprint model of a to-be-separated role may be trained first by using a speech feature of a speech data frame. Similar to the foregoing, the voiceprint model of the to-be-separated role can be obtained by training with the speech feature of the speech data frame based on the above-mentioned user-independent universal background model that is pre-trained. After the voiceprint model of the to-be-separated role is obtained, a mean supervector of the speech data frame can be extracted according to the voiceprint model. For example, means of all GMM components of a GMM-UBM model of the to-be-separated role can be spliced to obtain a mean supervector of the GMM-UBM model of the to-be-separated role, namely the mean supervector of the speech data frame. Then, the joint factor analysis (JFA) method or the simplified JFA method can be used to extract a low-dimensional voiceprint vector from the mean supervector of the speech data frame. Taking the i-vector as an example, after the above-mentioned user-independent universal background model (UBM model) is obtained by training, the mean supervector of the universal background model can be extracted, and the total variability space (T) matrix can be estimated. Then, based on the mean supervector of the speech data frame, the T matrix, and the mean supervector of the universal background model, the i-vector of the speech data frame is calculated. For example, the i-vector can be calculated according to the following formula:

$$M_{s,h} = m_u + T\omega_{s,h}$$

Herein, $M_{s,h}$ is a mean supervector obtained from a speech h of a role s; $m_u$ is the mean supervector of the universal background model; T is the total variability space matrix; $\omega_{s,h}$ is the total variability factor, namely the i-vector.

According to another embodiment, a trained deep neural network (DNN) can also be used to obtain a voiceprint vector of a speech data frame. Taking the d-vector as an example, DNN may comprise an input layer, a hidden layer, and an output layer. An FBank feature of the speech data frame can be input to the DNN input layer first, and the output of the last hidden layer of the DNN is the d-vector.

After the voiceprint vector of the speech data frame is obtained, a similarity score between the speech data frame and a user's voiceprint can be calculated based on the voiceprint vector of the speech data frame and the user's voiceprint vector. Here, algorithms such as a Support Vector Machine (SVM), a Linear Discriminant Analysis (LDA), a Probabilistic Linear Discriminant Analysis (PLDA), a likelihood, and a cosine distance can be used to calculate the similarity score between the speech data frame and the user's voiceprint.

Taking the PLDA algorithm as an example, assuming that a speech is composed of speeches of I roles, each role has J segments of different speeches, and the jth segment of speech of the ith role is defined as $Y_{ij}$, then the generative model of $Y_{ij}$ is defined as follows:

$$Y_{ij}=\mu+Fh_i+Gw_{ij}+\varepsilon_{ij}$$

wherein $\mu$ is the mean of the voiceprint vector, and F and G are spatial feature matrices, which respectively represent the inter-class feature space and the intra-class feature space of a role. Each column of F is equivalent to the feature vector of the inter-class feature space, and each column of G is equivalent to the feature vector of the intra-class feature space. The vectors $h_i$ and $w_{ij}$ can be regarded as the feature representations of the speech in their respective spaces, and $\varepsilon_{ij}$ is the noise covariance. The higher the likelihood that the $h_i$ features of two speeches are the same, that is, the higher the similarity score, the more likely they are from the same role.

A PLDA model involves 4 parameters, namely $\mu$, F, G, and $\varepsilon_{ij}$, which is iteratively trained with an EM algorithm. Typically, a simplified PLDA model can be used, which ignores the training of the intra-class feature space matrix G and only trains the inter-class feature space matrix F, that is:

$$Y_{ij}=\mu+Fh_i+\varepsilon_{ij}$$

Based on the voiceprint vector of the speech data frame, the hi feature of the speech data frame can be obtained with reference to the above formula. Similarly, based on the user's voiceprint vector, the hi feature of the user's speech can be obtained with reference to the above formula. Then, the log-likelihood ratio or cosine distance of the two hi features can be calculated as the similarity score between the speech data frame and the user's voiceprint.

It should be noted that the voiceprint is not limited to the above-mentioned voiceprint vectors (i-vector, d-vector, x-vector, etc.) and the above-mentioned voiceprint models (HMM model, GMM model, etc.), and the corresponding similarity scoring algorithm can also be arbitrarily selected according to the selected voiceprint, which is not limited herein.

In various implementation manners, if the obtained similarity score exceeds a similarity threshold, it is determined that the speech data frame matches the user's voiceprint, that is, it is determined that the speech data frame matches the user corresponding to the voiceprint. Otherwise, it is determined that the speech data frame does not match the user's voiceprint. It can be understood that the above description is exemplary only, which is not limited by this embodiment of the present disclosure.

Step S208: if the first identification result is different from the second identification result, use the second identification result to correct the first identification result to obtain a final identification result of the to-be-separated role.

In this embodiment of the present disclosure, if the first identification result is the same as second identification result, it is unnecessary to use the second identification result to correct the first identification result, and the first identification result is determined as the final identification result of the to-be-separated role. It can be understood that the above description is exemplary only, which is not limited by this embodiment of the present disclosure.

Step S210: separate the role based on the final identification result of the to-be-separated role.

In this embodiment of the present disclosure, after the final identification result of the to-be-separated role is obtained, the final identification result of the to-be-separated role can be used to distinguish the role, thereby achieving the separation of the to-be-separated role. It can be understood that the above description is exemplary only, which is not limited by this embodiment of the present disclosure.

In some example embodiments, after obtaining the final identification result of the to-be-separated role, the method further comprises: acquiring face image data of the to-be-separated role collected by an image collection device; performing face recognition on the face image data to obtain a third identification result of the to-be-separated role; and if the third identification result is different from the second identification result, using the third identification result to correct the second identification result to obtain the final identification result of the to-be-separated role. In this way, when the result of voiceprint identification performed on the speech data frame of the to-be-separated role within the preset time period is different from the result of face recognition performed on the face image data, by using the result of face recognition performed on the face image data to correct the result of voiceprint identification performed on the speech data frame of the to-be-separated role within the preset time period, the identification result of the to-be-separated role can be accurately obtained, and then the role can be accurately separated based thereon. It can be understood that the above description is exemplary only, which is not limited by this embodiment of the present disclosure.

In an example, the image collection device may be a camera. The speech collection device can acquire from the camera the face image data of the to-be-separated role collected by the camera. When performing face recognition on the face image data, it can perform face recognition on the face image data based on a face recognition model to obtain the third identification result of the to-be-separated role. Here, the face recognition model may be a neural network model used for face recognition. If the third identification result is the same as the second identification result, it is unnecessary to use the third identification result to correct the second identification result, and the second identification result is determined as the final identification result of the to-be-separated role. After the final identification result of the to-be-separated role is obtained, the final identification result of the to-be-separated role can be used to distinguish the role, thereby achieving the separation of the to-be-separated role. It can be understood that the above description is exemplary only, which is not limited by this embodiment of the present disclosure.

Figure 2B:
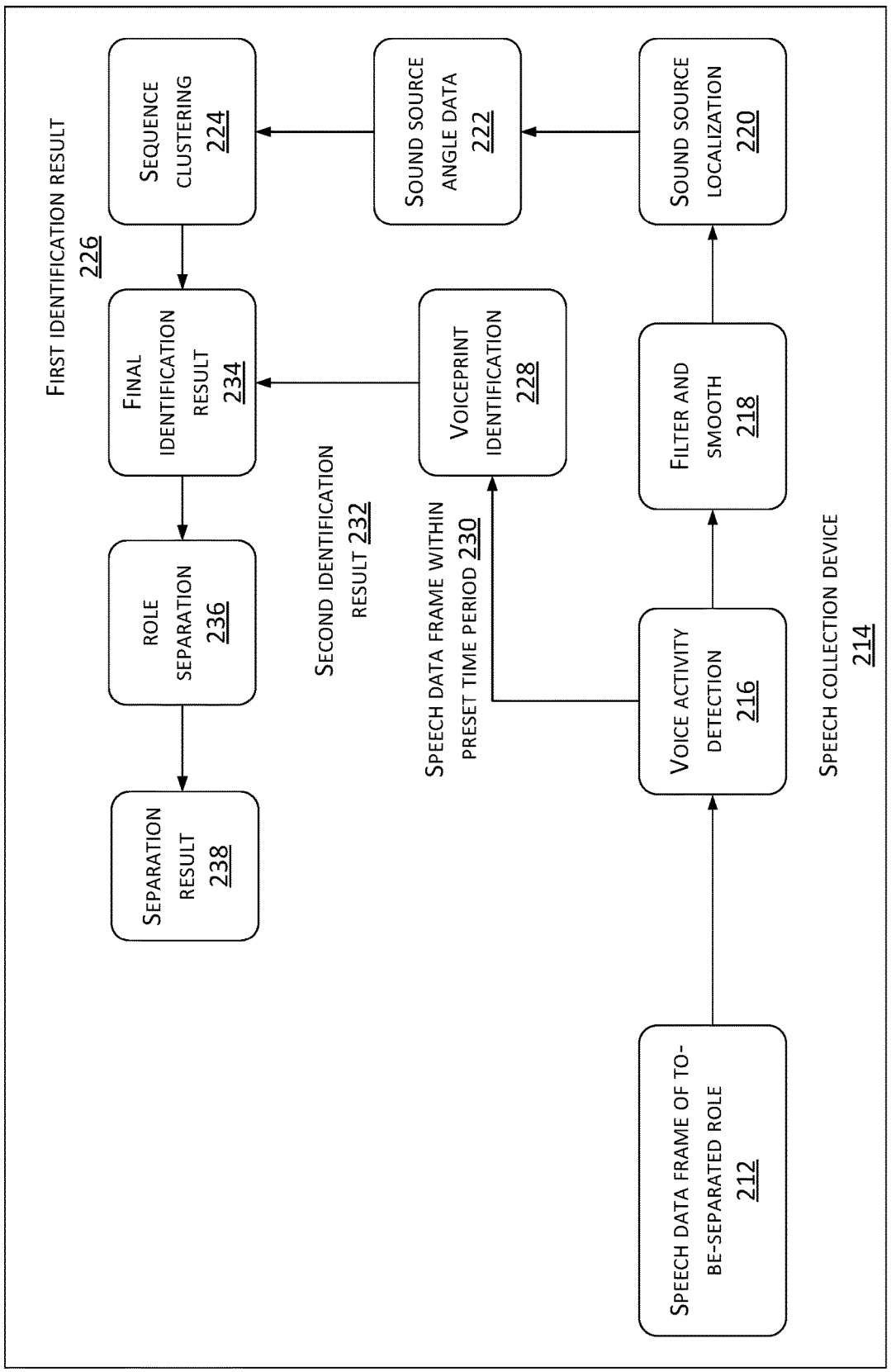
FIG. 2B is a schematic diagram of the scene of the role separation method provided in the second embodiment of the present disclosure.

In an example, as shown in FIG. 2B, the speech data frame of the to-be-separated role 212 is collected by a speech collection device 214. After the speech data frame of the to-be-separated role 212 is collected by the speech collection device, the following steps are performed: perform voice activity detection 216 on the speech data frame of the to-be-separated role to obtain a speech data frame with a voice activity; filter and smooth 218 the speech data frame with the voice activity based on an energy spectrum of the speech data frame of the to-be-separated role to obtain a filtered and smoothed speech data frame; perform sound source localization 220 on the filtered and smoothed speech data frame to determine sound source angle data 222; perform sequence clustering 224 on the sound source angle data 222 to obtain a sequence clustering result of the sound source angle data 222; determine that a role identifier corresponding to the sequence clustering result of the sound source angle data 222 is a first identification result 226 of the to-be-separated role; perform voiceprint identification 228 on a speech data frame of the to-be-separated role 212 within a preset time period 230 to obtain a second identification result 232 of the to-be-separated role; if the first identification result 226 is different from the second identification result 232, use the second identification result 232 to correct the first identification result 226 to obtain a final identification result 234 of the to-be-separated role; and finally perform role separation 236 the role based on the final identification result 234 of the to-be-separated role to obtain the separation result 238. It can be understood that the above description is exemplary only, which is not limited by this embodiment of the present disclosure.

Based on the above-described first embodiment, the following steps are performed: perform voiceprint identification on a speech data frame of the to-be-separated role within a preset time period to obtain a second identification result of the to-be-separated role; if the first identification result is different from the second identification result, use the second identification result to correct the first identification result to obtain a final identification result of the to-be-separated role; and finally separate the to-be-separated role based on the final identification result of the to-be-separated role. By using the result of voiceprint identification performed on the speech data frame of the role within the preset time period to correct the identification result obtained based on the sound source angle data when the identification result obtained based on the sound source angle data is different from the result of voiceprint identification performed on the speech data frame of the role within the preset time period, it can accurately obtain the identification result of the role and then accurately separate the role based thereon compared with existing methods in the conventional techniques.

The role separation method provided in this embodiment can be executed by any suitable device with data processing capability, which includes but is not limited to cameras, terminal devices, mobile terminals, PCs, servers, vehicle-mounted devices, entertainment devices, advertising devices, personal digital assistants (PDAs), tablets, laptops, handheld game consoles, smart glasses, smart watches, wearable devices, virtual display devices, augmented reality display devices, etc.

Referring to FIG. 3A, it shows a flowchart of the steps of a role separation method provided in a third embodiment of the present disclosure.

For example, the role separation method provided in this embodiment comprises the following steps:

Step S302: send to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role.

In this embodiment of the present disclosure, a speech collection device sends to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role. Here, the implementation manner of acquiring, by the cloud, sound source angle data corresponding to the speech data frame based on the role separation request is similar to that of acquiring sound source angle data corresponding to a speech data frame of a to-be-separated role collected by a speech collection device in the above-described first embodiment, and will not be elaborated herein. The implementation manner of performing, by the cloud, identification on the to-be-separated role based on the sound source angle data is similar to that of performing identification on the to-be-separated role based on the sound source angle data in the above-described first embodiment, and will not be elaborated herein. The implementation manner of separating, by the cloud, the role based on an identification result of the to-be-separated role is similar to that of separating the role based on an identification result of the to-be-separated role in the above-described first embodiment, and will not be elaborated herein. It can be understood that the above description is exemplary only, which is not limited by this embodiment of the present disclosure.

S304: receive a separation result of the role sent by the cloud based on the role separation request In this embodiment of the present disclosure, a speech collection device receives a separation result of the role sent by the cloud based on the role separation request. It can be understood that the above description is exemplary only, which is not limited by this embodiment of the present disclosure.

Figure 3B:
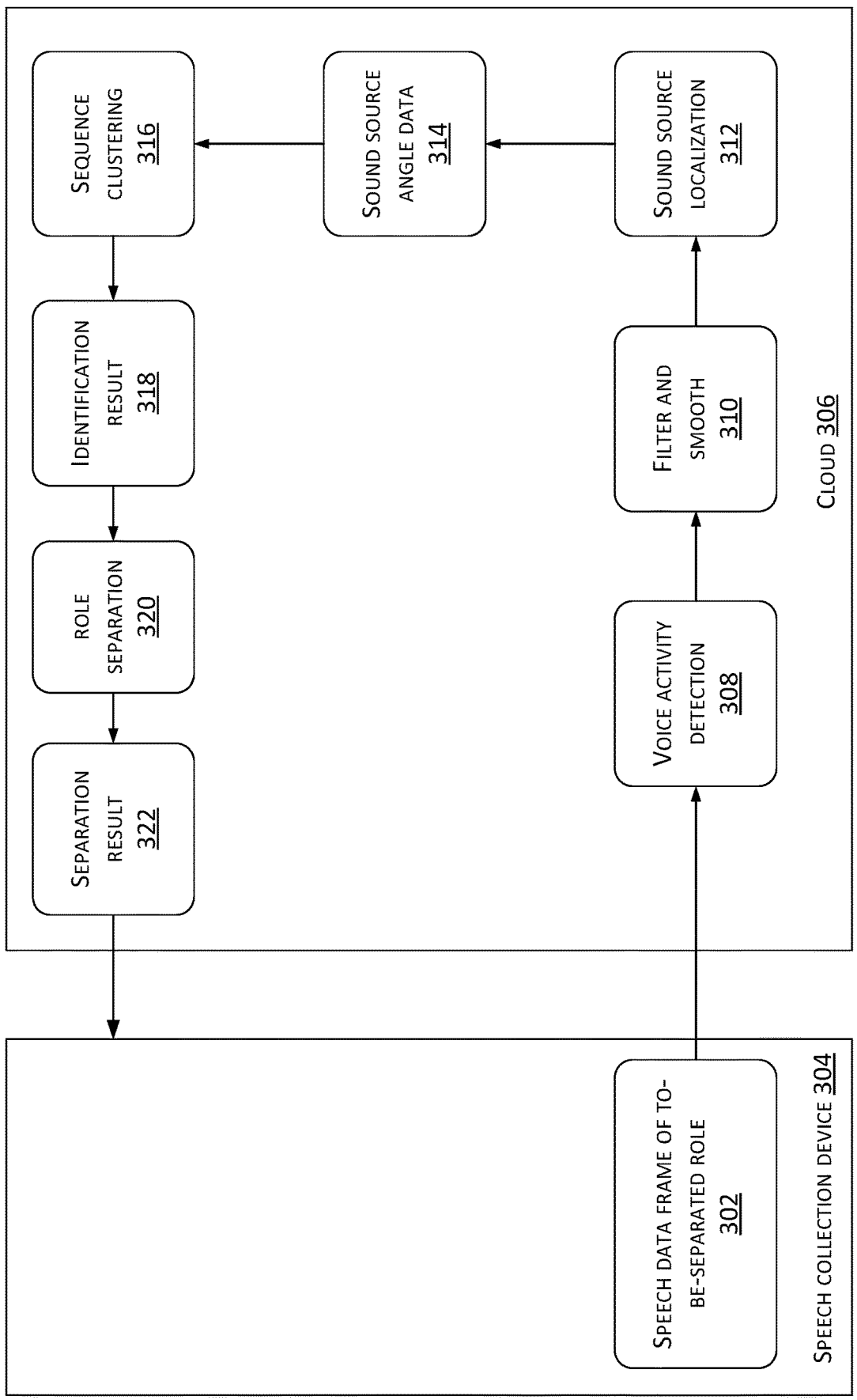
FIG. 3B is a schematic diagram of the scene of the role separation method provided in the third embodiment of the present disclosure.

In an example, as shown in FIG. 3B, the speech data frame of the to-be-separated role 302 is collected by a speech collection device 304. After the speech data frame of the to-be-separated role 302 is collected by the speech collection device 304, the speech data frame of the to-be-separated role 302 is sent to the cloud 306, including one or more servers, to separate the role. For example, the cloud 306 performs voice activity detection 308 on the speech data frame of the to-be-separated role 302 to obtain a speech data frame with a voice activity; filters and smooths 310 the speech data frame with the voice activity based on an energy spectrum of the speech data frame of the to-be-separated role 302 to obtain a filtered and smoothed speech data frame; performs sound source localization 312 on the filtered and smoothed speech data frame to determine sound source angle data 314; performs sequence clustering 316 on the sound source angle data 314 to obtain a sequence clustering result of the sound source angle data 314; determines that a role identifier corresponding to the sequence clustering result of the sound source angle data 314 is an identification result 318 of the to-be-separated role; and finally performs the role separation 320 based on the identification result 318 of the to-be-separated role, and sends a separation result 322 of the role to the speech collection device 304. It can be understood that the above description is exemplary only, which is not limited by this embodiment of the present disclosure.

By the role separation method provided in this embodiment of the present disclosure, a speech collection device sends to a cloud a role separation request carrying a speech data frame of a to-be-separated role, the cloud acquires sound source angle data corresponding to the speech data frame based on the role separation request, performs identification on the to-be-separated role based on the sound source angle data, and separates the role based on an identification result of the to-be-separated role, and the speech collection device receives a separation result of the role sent by the cloud based on the role separation request. By performing identification on the to-be-separated role based on the sound source angle data corresponding to the speech data frame of the to-be-separated role carried by the role separation request, and separating the role based on the identification result of the to-be-separated role, the method can separate the role in real time, thereby creating smoother user experiences than existing methods in the conventional techniques.

The role separation method provided in this embodiment can be executed by any suitable device with data processing capability, which includes but is not limited to cameras, terminal devices, mobile terminals, PCs, servers, vehicle-mounted devices, entertainment devices, advertising devices, personal digital assistants (PDAs), tablets, laptops, handheld game consoles, smart glasses, smart watches, wearable devices, virtual display devices, augmented reality display devices, etc.

Figure 4A:
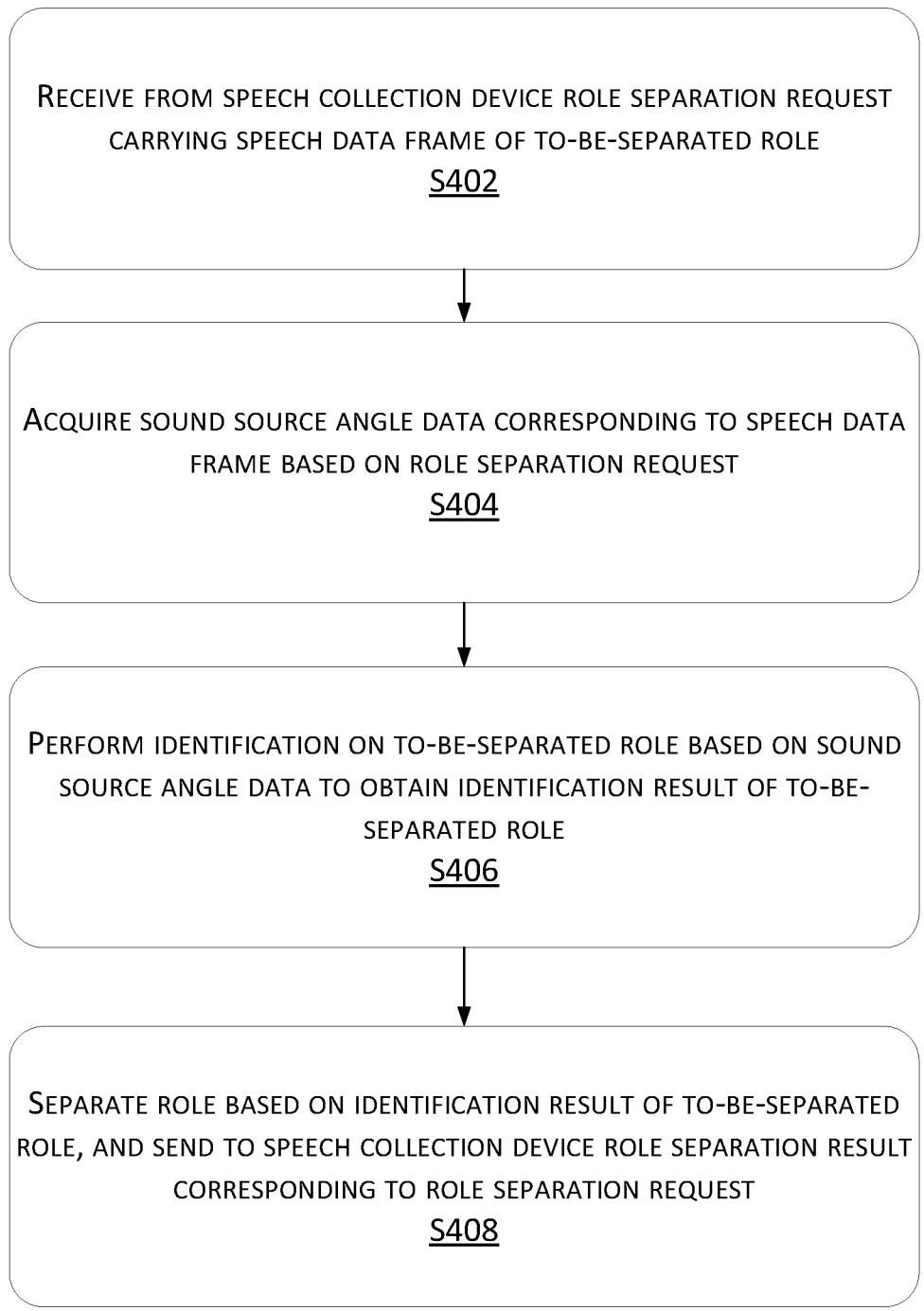
FIG. 4A is a flowchart of the steps of a role separation method provided in a fourth embodiment of the present disclosure.

Referring to FIG. 4A, it shows a flowchart of the steps of a role separation method provided in a fourth embodiment of the present disclosure For example, the role separation method provided in this embodiment comprises the following steps:

Step S402: receive from a speech collection device a role separation request carrying a speech data frame of a to-be-separated role.

In this embodiment of the present disclosure, a cloud receives from a speech collection device a role separation request carrying a speech data frame of a to-be-separated role. It can be understood that the above description is exemplary only, which is not limited by this embodiment of the present disclosure.

Step S404: acquire sound source angle data corresponding to the speech data frame based on the role separation request.

In this embodiment of the present disclosure, the implementation manner of acquiring, by the cloud, sound source angle data corresponding to the speech data frame based on the role separation request is similar to that of acquiring sound source angle data corresponding to a speech data frame of a to-be-separated role collected by a speech collection device in the above-described first embodiment, and will not be elaborated herein. It can be understood that the above description is exemplary only, which is not limited by this embodiment of the present disclosure.

Step S406: perform identification on the to-be-separated role based on the sound source angle data to obtain an identification result of the to-be-separated role.

In this embodiment of the present disclosure, the implementation manner of performing, by the cloud, identification on the to-be-separated role based on the sound source angle data to obtain an identification result of the to-be-separated role is similar to that of performing identification on the to-be-separated role based on the sound source angle data to obtain a first identification result of the to-be-separated role in the above-described first embodiment, and will not be elaborated herein. It can be understood that the above description is exemplary only, which is not limited by this embodiment of the present disclosure.

Step S408: separate the role based on the identification result of the to-be-separated role, and send to the speech collection device a role separation result corresponding to the role separation request.

In this embodiment of the present disclosure, the cloud separates the role based on the identification result of the to-be-separated role and sends to the speech collection device a role separation result corresponding to the role separation request. It can be understood that the above description is exemplary only, which is not limited by this embodiment of the present disclosure.

Figure 4B:
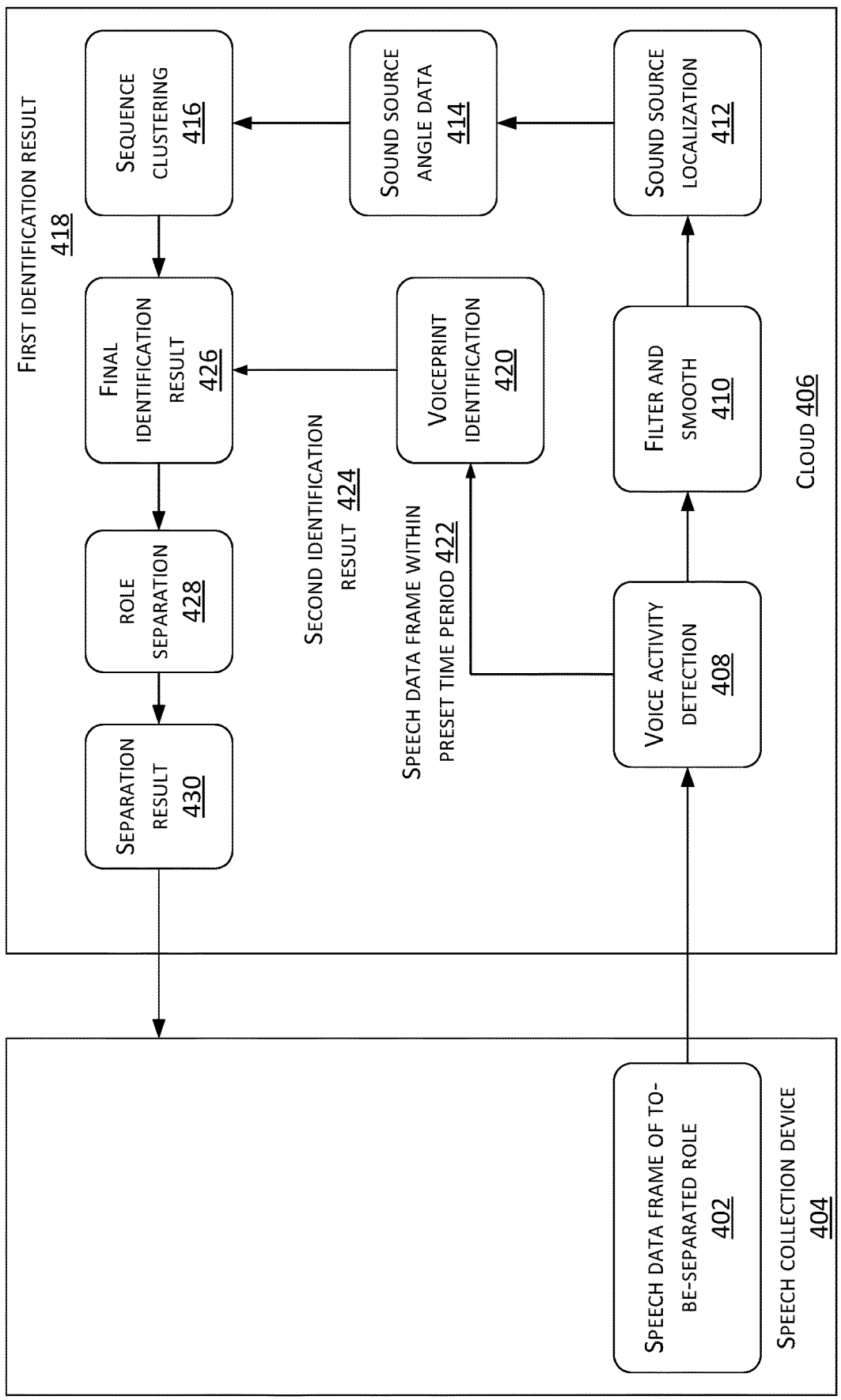
FIG. 4B is a schematic diagram of the scene of the role separation method provided in the fourth embodiment of the present disclosure.

In an example, as shown in FIG. 4B, the speech data frame of the to-be-separated role 402 is collected by a speech collection device 404. After the speech data frame of the to-be-separated role 402 is collected by the speech collection device 404, the speech data frame of the to-be-separated role 402 is sent to the cloud 406 including one or more servers to separate the role. For example, the cloud 406 performs voice activity detection 408 on the speech data frame of the to-be-separated role to obtain a speech data frame with a voice activity; filters and smooths 410 the speech data frame with the voice activity based on an energy spectrum of the speech data frame of the to-be-separated role 402 to obtain a filtered and smoothed speech data frame; performs sound source localization 412 on the filtered and smoothed speech data frame to determine sound source angle data 414; performs sequence clustering 416 on the sound source angle data 414 to obtain a sequence clustering result of the sound source angle data 414; determines that a role identifier corresponding to the sequence clustering result of the sound source angle data is a first identification result 418 of the to-be-separated role; performs voiceprint identification 420 on the speech data frame of the to-be-separated role 402 within a preset time period to obtain a second identification result 424 of the to-be-separated role; if the first identification result 418 is different from the second identification result 424, uses the second identification result 424 to correct the first identification result 418 to obtain a final identification result 426 of the to-be-separated role; and finally performs the role separation 428 based on the final identification result 426 of the to-be-separated role, and sends a separation result 430 of the to-be-separated role to the speech collection device 404. It can be understood that the above description is exemplary only, which is not limited by this embodiment of the present disclosure.

By the role separation method provided in this embodiment of the present disclosure, a cloud receives from a speech collection device a role separation request carrying a speech data frame of a to-be-separated role, acquires sound source angle data corresponding to the speech data frame based on the role separation request, performs identification on the to-be-separated role based on the sound source angle data to obtain an identification result of the to-be-separated role, separates the role based on the identification result of the to-be-separated role, and finally sends to the speech collection device a separation result of the role corresponding to the role separation request. By performing identification on the to-be-separated role based on the sound source angle data corresponding to the speech data frame of the to-be-separated role carried by the role separation request, and separating the role based on the identification result of the to-be-separated role, the method can separate the role in real time, thereby creating smoother user experiences than existing methods in the conventional techniques.

The role separation method provided in this embodiment can be executed by any suitable device with data processing capability, which includes but is not limited to cameras, terminal devices, mobile terminals, PCs, servers, vehicle-mounted devices, entertainment devices, advertising devices, personal digital assistants (PDAs), tablets, laptops, handheld game consoles, smart glasses, smart watches, wearable devices, virtual display devices, augmented reality display devices, etc.

Referring to FIG. 5, it shows a flowchart of the steps of a meeting minutes recording method provided in a fifth embodiment of the present disclosure.

For example, the meeting minutes recording method provided in this embodiment comprises the following steps:

Step S502: acquire sound source angle data corresponding to a speech data frame of a meeting role collected by a speech collection device disposed in a meeting room.

In this embodiment of the present disclosure, the speech collection device disposed in the meeting room may be a pickup disposed in the meeting room. The meeting role can be understood as a person attending a meeting. Here, the implementation manner of acquiring sound source angle data corresponding to a speech data frame of a meeting role collected by a speech collection device disposed in a meeting room is similar to that of acquiring sound source angle data corresponding to a speech data frame of a to-be-separated role collected by a speech collection device in the above-described first embodiment, and will not be elaborated herein. It can be understood that the above description is exemplary only, which is not limited by this embodiment of the present disclosure.

Step S504: perform identification on the meeting role based on the sound source angle data to obtain an identification result of the meeting role.

In this embodiment of the present disclosure, the implementation manner of performing identification on the meeting role based on the sound source angle data to obtain an identification result of the meeting role is similar to that of performing identification on the to-be-separated role based on the sound source angle data to obtain a first identification result of the to-be-separated role in the above-described first embodiment, and will not be elaborated herein. It can be understood that the above description is exemplary only, which is not limited by this embodiment of the present disclosure.

Step S506: record meeting minutes of the meeting role based on the identification result of the meeting role.

In this embodiment of the present disclosure, after the identification result of the meeting role is obtained, the identification result of the meeting role can be used to distinguish the meeting role, and then the meeting minutes of the meeting role can be recorded in real time. It can be understood that the above description is exemplary only, which is not limited by this embodiment of the present disclosure.

In an example, when recording meeting minutes of the meeting role based on the identification result of the meeting role, perform speech recognition on speech data of the meeting minutes of the meeting role based on the identification result of the meeting role to obtain text data of the meeting minutes of the meeting role, and record the text data of the meeting minutes of the meeting role. It can be understood that the above description is exemplary only, which is not limited by this embodiment of the present disclosure.

By the meeting minutes recording method provided in this embodiment of the present disclosure, acquire sound source angle data corresponding to a speech data frame of a meeting role collected by a speech collection device disposed in a meeting room; perform identification on the meeting role based on the sound source angle data to obtain an identification result of the meeting role; and record meeting minutes of the meeting role based on the identification result of the meeting role. By performing identification on the meeting role based on the sound source angle data corresponding to the speech data frame of the meeting role collected by the speech collection device disposed in the meeting room, and recording the meeting minutes of the meeting role based on the identification result of the meeting role, the method can record the meeting minutes of the meeting role in real time, thereby effectively improving the efficiency of recording the meeting minutes of the meeting role compared with existing methods in the conventional techniques.

The meeting minutes recording method provided in this embodiment can be executed by any suitable device with data processing capability, which includes but is not limited to cameras, terminal devices, mobile terminals, PCs, servers, vehicle-mounted devices, entertainment devices, advertising devices, personal digital assistants (PDAs), tablets, laptops, handheld game consoles, smart glasses, smart watches, wearable devices, virtual display devices, augmented reality display devices, etc.

Figure 6:
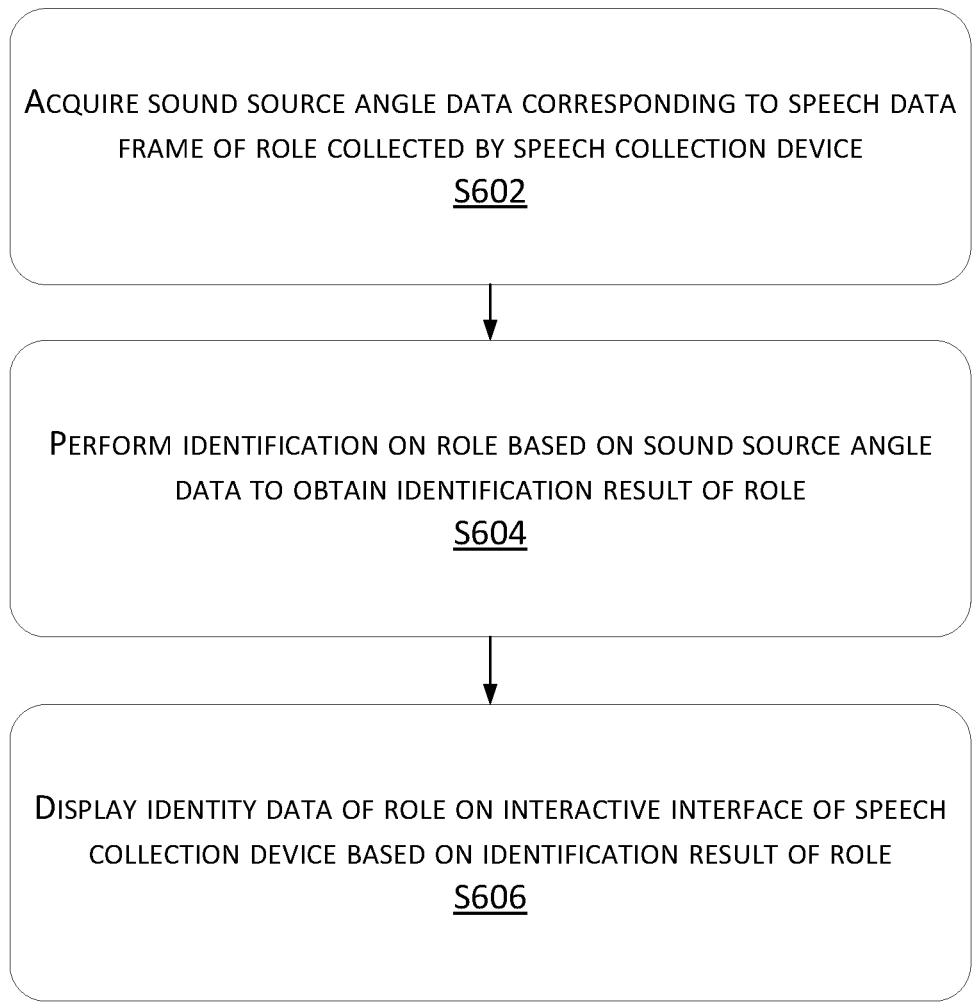
FIG. 6 is a flowchart of the steps of a role display method provided in a sixth embodiment of the present disclosure.

Referring to FIG. 6, it shows a flowchart of the steps of a role display method provided in a sixth embodiment of the present disclosure.

For example, the role display method provided in this embodiment comprises the following steps:

Step S602: acquire sound source angle data corresponding to a speech data frame of a role collected by a speech collection device.

In this embodiment of the present disclosure, the implementation manner of acquiring sound source angle data corresponding to a speech data frame of a role collected by a speech collection device is similar to that of acquiring sound source angle data corresponding to a speech data frame of a to-be-separated role collected by a speech collection device in the above-described first embodiment, and will not be elaborated herein. It can be understood that the above description is exemplary only, which is not limited by this embodiment of the present disclosure.

Step S604: perform identification on the role based on the sound source angle data to obtain an identification result of the role.

In this embodiment of the present disclosure, the implementation manner of performing identification on the role based on the sound source angle data to obtain an identification result of the role is similar to that of performing identification on the to-be-separated role based on the sound source angle data to obtain a first identification result of the to-be-separated role in the above-described first embodiment, and will not be elaborated herein. It can be understood that the above description is exemplary only, which is not limited by this embodiment of the present disclosure.

In some example embodiments, after acquiring the sound source angle data corresponding to the speech data frame of the role collected by the speech collection device, the method further comprises switching on lamps of the speech collection device in a sound source direction indicated by the sound source angle data. In this way, by switching on the lamps of the speech collection device in the sound source direction indicated by the sound source angle data, the sound source direction can be effectively indicated. It can be understood that the above description is exemplary only, which is not limited by this embodiment of the present disclosure.

In an example, the lamps of the speech collection device are arranged in various directions of the speech collection device in an array manner, so that the sound source direction can be effectively indicated. It can be understood that the above description is exemplary only, which is not limited by this embodiment of the present disclosure.

Step S606: display identity data of the role on an interactive interface of the speech collection device based on the identification result of the role.

In this embodiment of the present disclosure, the interactive interface of the speech collection device may be a touch screen of the speech collection device. The identity data of the role may be the role's face image data, identification data, and the like. It can be understood that the above description is exemplary only, which is not limited by this embodiment of the present disclosure.

In some example embodiments, the method further comprises displaying speaking action images or speech waveform images of the role on the interactive interface of the speech collection device. In this way, the image of the role when speaking can be more vividly displayed. It can be understood that the above description is exemplary only, which is not limited by this embodiment of the present disclosure.

In an example, a sequence of the speaking action images or speech waveform images of the role can be dynamically displayed on the interactive interface of the speech collection device. It can be understood that the above description is exemplary only, which is not limited by this embodiment of the present disclosure.

By the role display method provided in this embodiment of the present disclosure, acquire sound source angle data corresponding to a speech data frame of a role collected by a speech collection device; perform identification on the role based on the sound source angle data to obtain an identification result of the role; and display identity data of the role on an interactive interface of the speech collection device based on the identification result of the role. By performing identification on the role based on the sound source angle data corresponding to the speech data frame of the role collected by the speech collection device, and displaying the identity data of the role on the interactive interface of the speech collection device based on the identification result of the role, the method can display the identity data of the role in real time, thereby creating smoother user experiences than existing methods in the conventional techniques.

The role display method provided in this embodiment can be executed by any suitable device with data processing capability, which includes but is not limited to cameras, terminal devices, mobile terminals, PCs, servers, vehicle-mounted devices, entertainment devices, advertising devices, personal digital assistants (PDAs), tablets, laptops, handheld game consoles, smart glasses, smart watches, wearable devices, virtual display devices, augmented reality display devices, etc.

Figure 7:
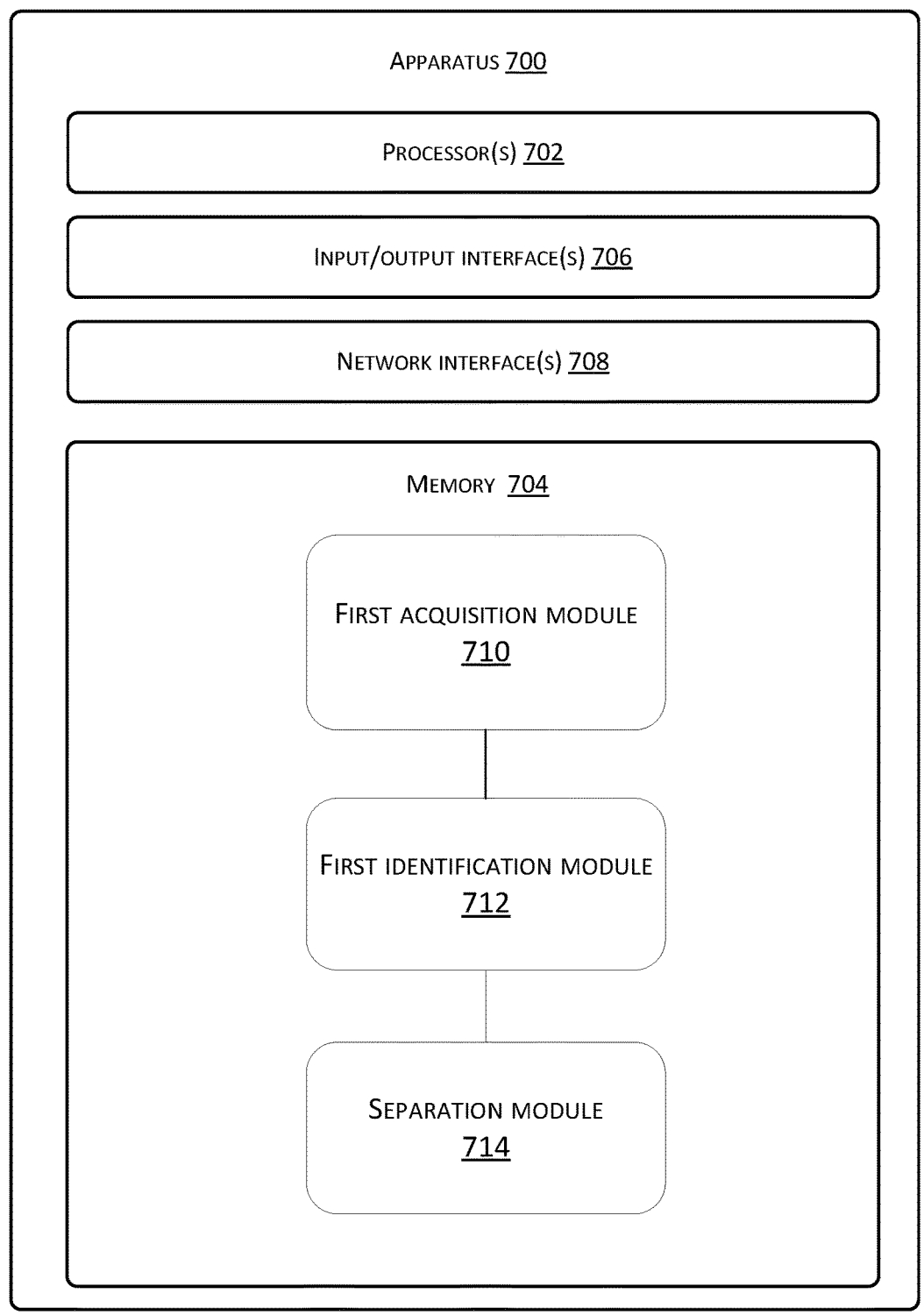
FIG. 7 is a schematic structural diagram of a role separation apparatus provided in a seventh embodiment of the present disclosure.

Referring to FIG. 7, it shows a schematic structural diagram of a role separation apparatus provided in a seventh embodiment of the present disclosure. As shown in FIG. 7, the apparatus 700 includes one or more processor(s) 702 or data processing unit(s) and memory 704. The apparatus 700 may further include one or more input/output interface(s) 706 and one or more network interface(s) 708. The memory 704 is an example of computer-readable media.

Computer-readable media further include non-volatile and volatile, removable and non-removable media employing any method or technique to achieve information storage. The information may be computer-readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices, or any other non-transmission medium, which may be used to store information that can be accessed by a computing device. As defined herein, the computer-readable media do not include transitory media, such as modulated data signals and carriers.

The memory 704 may store therein a plurality of modules or units including: a first acquisition module 710, configured to acquire sound source angle data corresponding to a speech data frame of a to-be-separated role collected by a speech collection device; a first identification module 712, configured to perform identification on the to-be-separated role based on the sound source angle data to obtain a first identification result of the to-be-separated role; and a separation module 714, configured to separate the to-be-separated role based on the first identification result of the to-be-separated role.

The role separation apparatus provided in this embodiment is used for implementing the corresponding role separation methods in the multiple method embodiments described above and has the beneficial effects of the corresponding method embodiments, which will not be elaborated herein.

Figure 8:
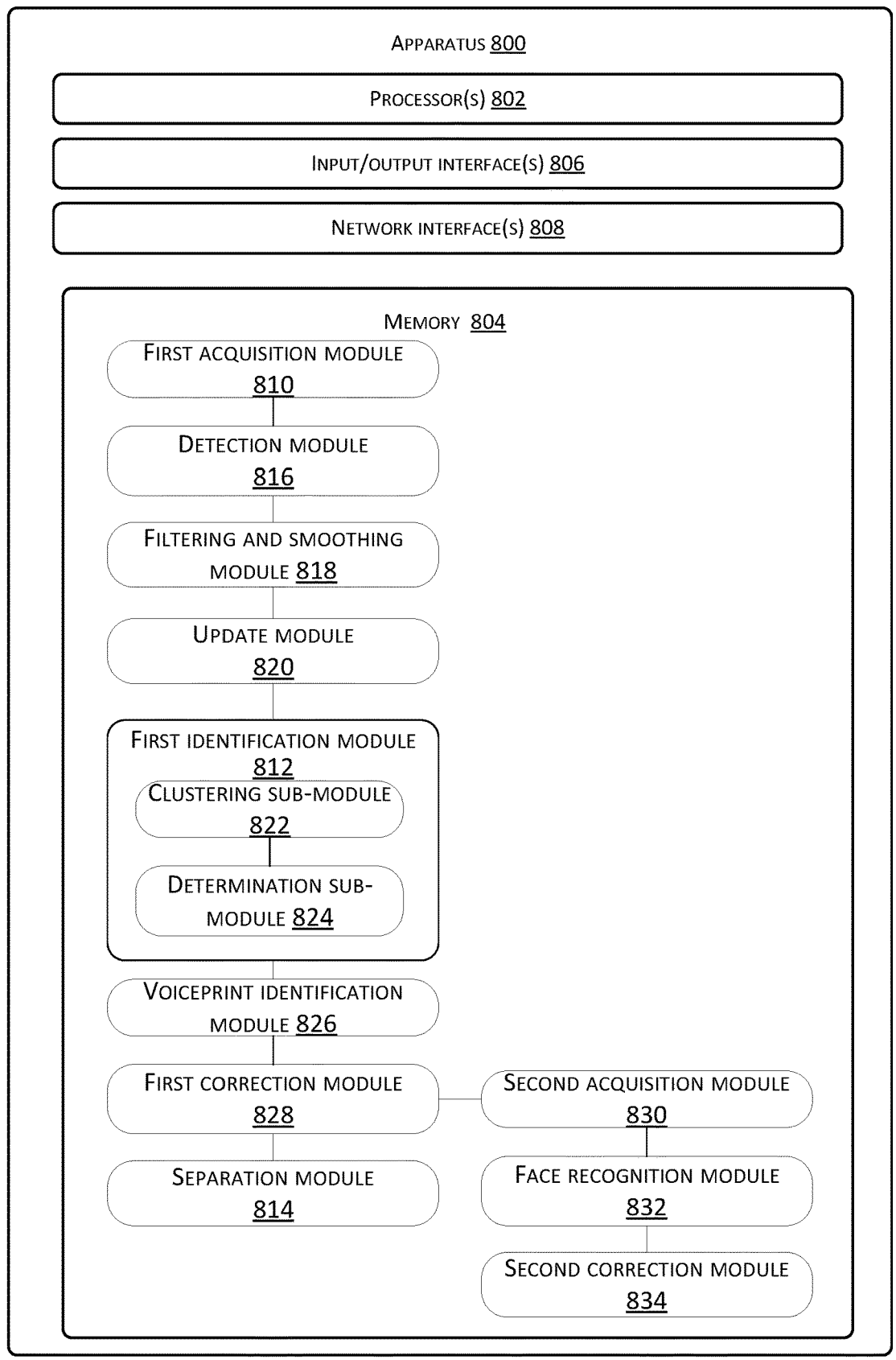
FIG. 8 is a schematic structural diagram of a role separation apparatus provided in an eighth embodiment of the present disclosure.

Referring to FIG. 8, it shows a schematic structural diagram of a role separation apparatus provided in an eighth embodiment of the present disclosure. As shown in FIG. 8, the apparatus 800 includes one or more processor(s) 802 or data processing unit(s) and memory 804. The apparatus 800 may further include one or more input/output interface(s) 806 and one or more network interface(s) 808. The memory 804 is an example of computer-readable media.

The memory 804 may store therein a plurality of modules or units including: a first acquisition module 810, configured to acquire sound source angle data corresponding to a speech data frame of a to-be-separated role collected by a speech collection device; a first identification module 812, configured to perform identification on the to-be-separated role based on the sound source angle data to obtain a first identification result of the to-be-separated role; and a separation module 814, configured to separate the to-be-separated role based on the first identification result of the to-be-separated role.

For example, in addition to the first acquisition module 810, the apparatus 800 further comprises the following modules or units stored in the memory 804: a detection module 816, configured to perform voice activity detection on the speech data frame of the to-be-separated role to obtain a speech data frame with a voice activity; a filtering and smoothing module 818, configured to filter and smooth the speech data frame with the voice activity based on an energy spectrum of the speech data frame of the to-be-separated role to obtain a filtered and smoothed speech data frame; and an update module 820, configured to update the sound source angle data based on the filtered and smoothed speech data frame to obtain updated sound source angle data.

For example, the filtering and smoothing module 818 is configured to: filter and smooth the speech data frame with the voice activity through a median filter based on spectral flatness of the energy spectrum of the speech data frame of the to-be-separated role to obtain the filtered and smoothed speech data frame.

For example, the first identification module 812 comprises: a clustering sub-module 822, configured to perform sequence clustering on the sound source angle data to obtain a sequence clustering result of the sound source angle data; and a determination sub-module 824, configured to determine that a role identifier corresponding to the sequence clustering result of the sound source angle data is the first identification result of the to-be-separated role.

For example, the clustering sub-module 822 is configured to: determine a distance between the sound source angle data and a sound source angle sequence clustering center; and determine the sequence clustering result of the sound source angle data based on the distance between the sound source angle data and the sound source angle sequence clustering center.

For example, in addition to the first identification module 812, the apparatus 800 further comprises the following modules or units stored in the memory 804: a voiceprint identification module 826, configured to perform voiceprint identification on a speech data frame of the to-be-separated role within a preset time period to obtain a second identification result of the to-be-separated role; and a first correction module 828, configured to, if the first identification result is different from the second identification result, use the second identification result to correct the first identification result to obtain a final identification result of the to-be-separated role.

For example, the speech collection device comprises a microphone array, and the first acquisition module 810 is configured to: acquire a covariance matrix of the speech data frame received by at least some microphones in the microphone array; perform eigenvalue decomposition on the covariance matrix to obtain multiple eigenvalues; select a first quantity of largest eigenvalues from the multiple eigenvalues, and form a speech signal sub-space based on eigenvectors corresponding to the selected eigenvalues, wherein the first quantity is equivalent to an estimated quantity of sound sources; and determine the sound source angle data based on the speech signal sub-space.

For example, in addition to the first correction module 807, the apparatus 800 further comprises the following modules or units stored in the memory 804: a second acquisition module 830, configured to acquire face image data of the to-be-separated role collected by an image collection device; a face recognition module 832, configured to perform face recognition on the face image data to obtain a third identification result of the to-be-separated role; and a second correction module 834, configured to, if the third identification result is different from the second identification result, use the third identification result to correct the second identification result to obtain the final identification result of the to-be-separated role.

The role separation apparatus provided in this embodiment is used for implementing the corresponding role separation methods in the multiple method embodiments described above and has the beneficial effects of the corresponding method embodiments, which will not be elaborated herein.

Figure 9:
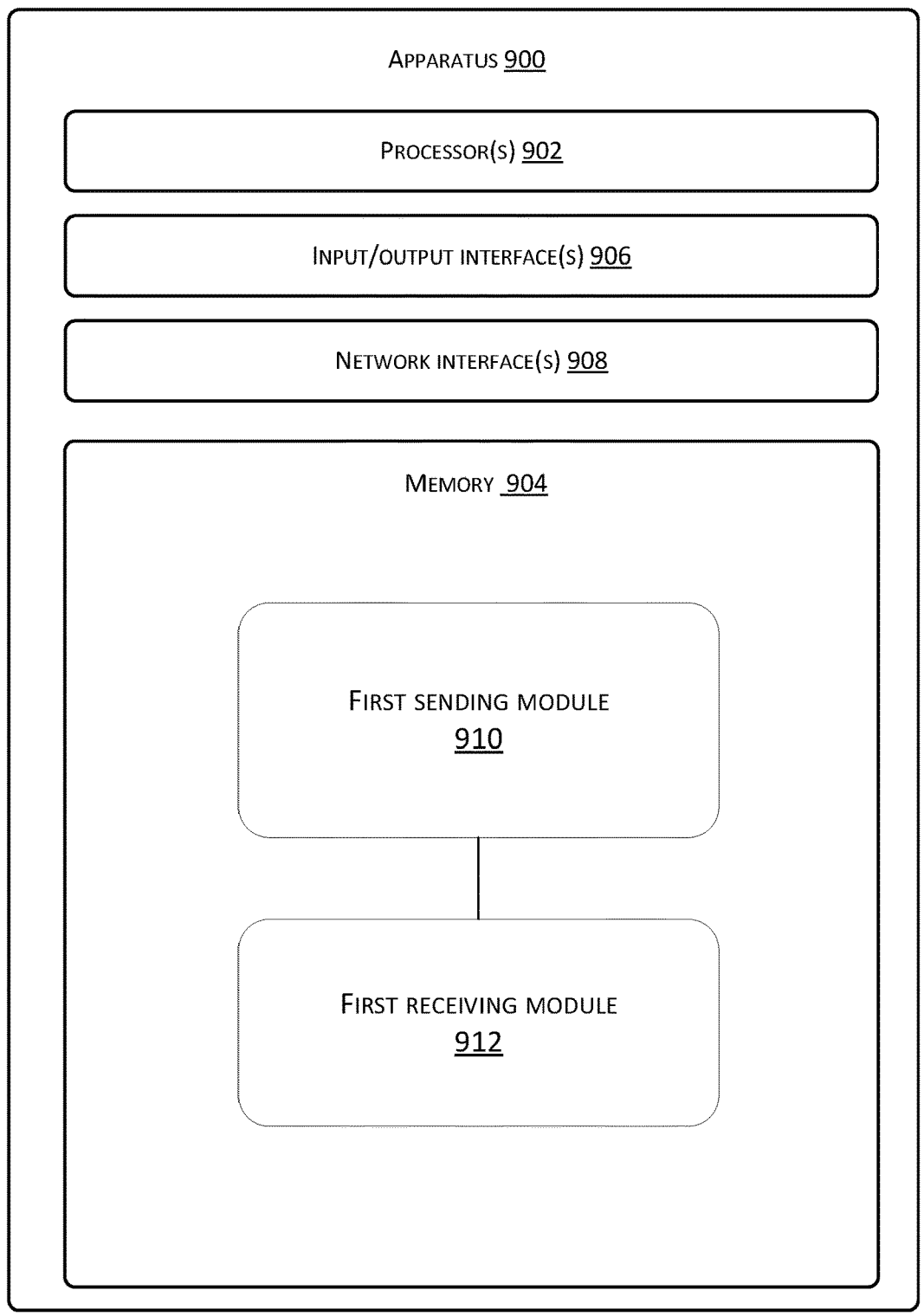
FIG. 9 is a schematic structural diagram of a role separation apparatus provided in a ninth embodiment of the present disclosure.

Referring to FIG. 9, it shows a schematic structural diagram of a role separation apparatus provided in a ninth embodiment of the present disclosure. As shown in FIG. 9, the apparatus 900 includes one or more processor(s) 902 or data processing unit(s) and memory 904. The apparatus 900 may further include one or more input/output interface(s) 906 and one or more network interface(s) 908. The memory 904 is an example of computer-readable media.

The memory 904 may store therein a plurality of modules or units including: a first sending module 910, configured to send to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role; and a first receiving module 912, configured to receive a separation result of the role sent by the cloud based on the role separation request.

The role separation apparatus provided in this embodiment is used for implementing the corresponding role separation methods in the multiple method embodiments described above and has the beneficial effects of the corresponding method embodiments, which will not be elaborated herein.

Figure 10:
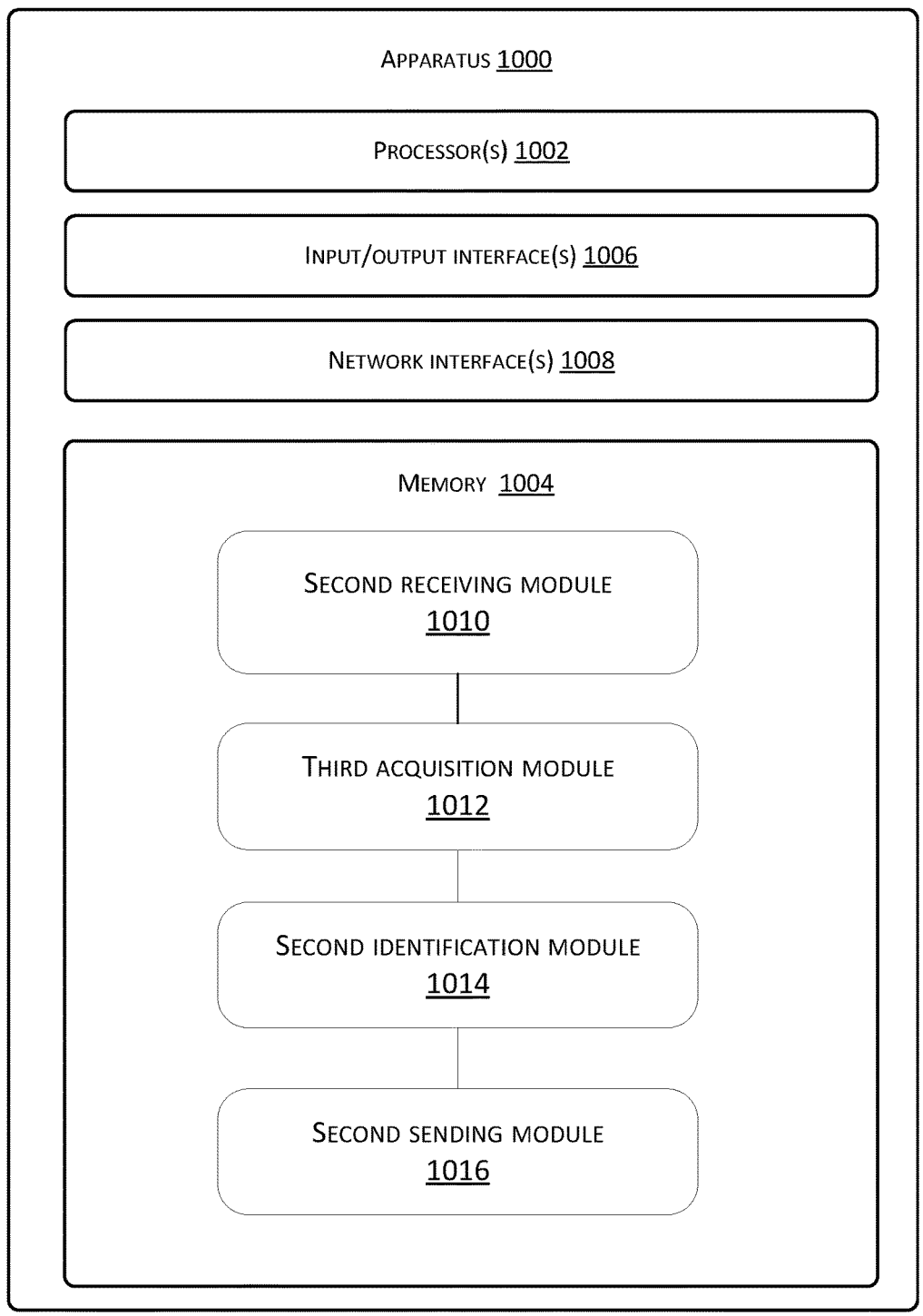
FIG. 10 is a schematic structural diagram of a role separation apparatus provided in a tenth embodiment of the present disclosure.

Referring to FIG. 10, it shows a schematic structural diagram of a role separation apparatus provided in a tenth embodiment of the present disclosure. As shown in FIG. 10, the apparatus 1000 includes one or more processor(s) 1002 or data processing unit(s) and memory 1004. The apparatus 1000 may further include one or more input/output interface(s) 1006 and one or more network interface(s) 1008. The memory 1004 is an example of computer-readable media.

The memory 1004 may store therein a plurality of modules or units including: a second receiving module 1010, configured to receive from a speech collection device a role separation request carrying a speech data frame of a to-be-separated role; a third acquisition module 1012, configured to acquire sound source angle data corresponding to the speech data frame based on the role separation request; a second identification module 1014, configured to perform identification on the to-be-separated role based on the sound source angle data to obtain an identification result of the to-be-separated role; and a second sending module 1016, configured to separate the role based on the identification result of the to-be-separated role, and send to the speech collection device a role separation result corresponding to the role separation request.

The role separation apparatus provided in this embodiment is used for implementing the corresponding role separation methods in the multiple method embodiments described above and has the beneficial effects of the corresponding method embodiments, which will not be elaborated herein.

Figure 11:
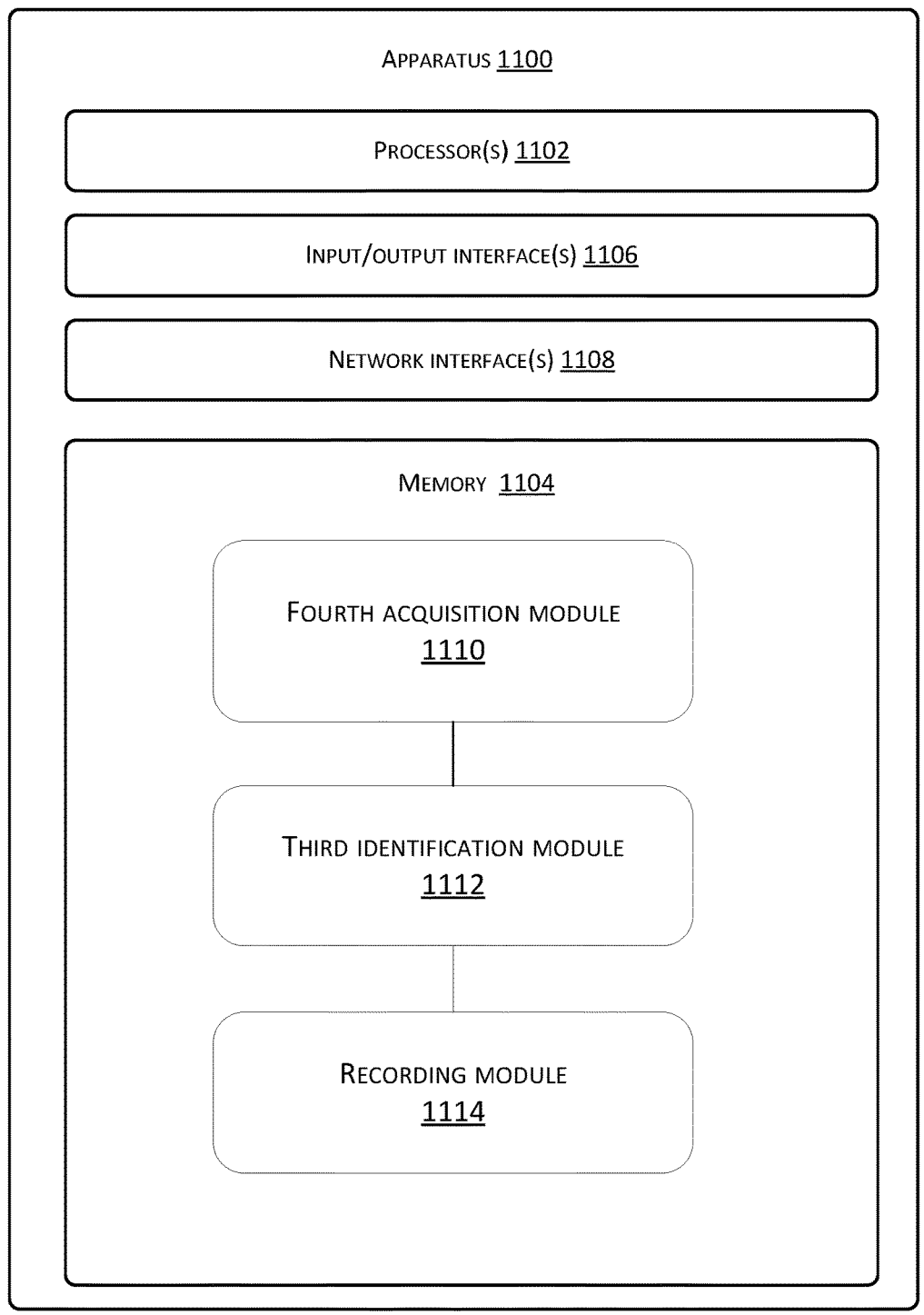
FIG. 11 is a schematic structural diagram of a meeting minutes recording apparatus provided in an eleventh embodiment of the present disclosure.

Referring to FIG. 11, it shows a schematic structural diagram of a meeting minutes recording apparatus provided in an eleventh embodiment of the present disclosure. As shown in FIG. 10, the apparatus 1100 includes one or more processor(s) 1102 or data processing unit(s) and memory 1104. The apparatus 1100 may further include one or more input/output interface(s) 1106 and one or more network interface(s) 1108. The memory 1104 is an example of computer-readable media.

The memory 1104 may store therein a plurality of modules or units including: a fourth acquisition module 1101, configured to acquire sound source angle data corresponding to a speech data frame of a meeting role collected by a speech collection device disposed in a meeting room; a third identification module 1112, configured to perform identification on the meeting role based on the sound source angle data to obtain an identification result of the meeting role; and a recording module 1114, configured to record meeting minutes of the meeting role based on the identification result of the meeting role.

The meeting minutes recording apparatus provided in this embodiment is used for implementing the corresponding meeting minutes recording methods in the multiple method embodiments described above, and has the beneficial effects of the corresponding method embodiments, which will not be elaborated herein.

Figure 12:
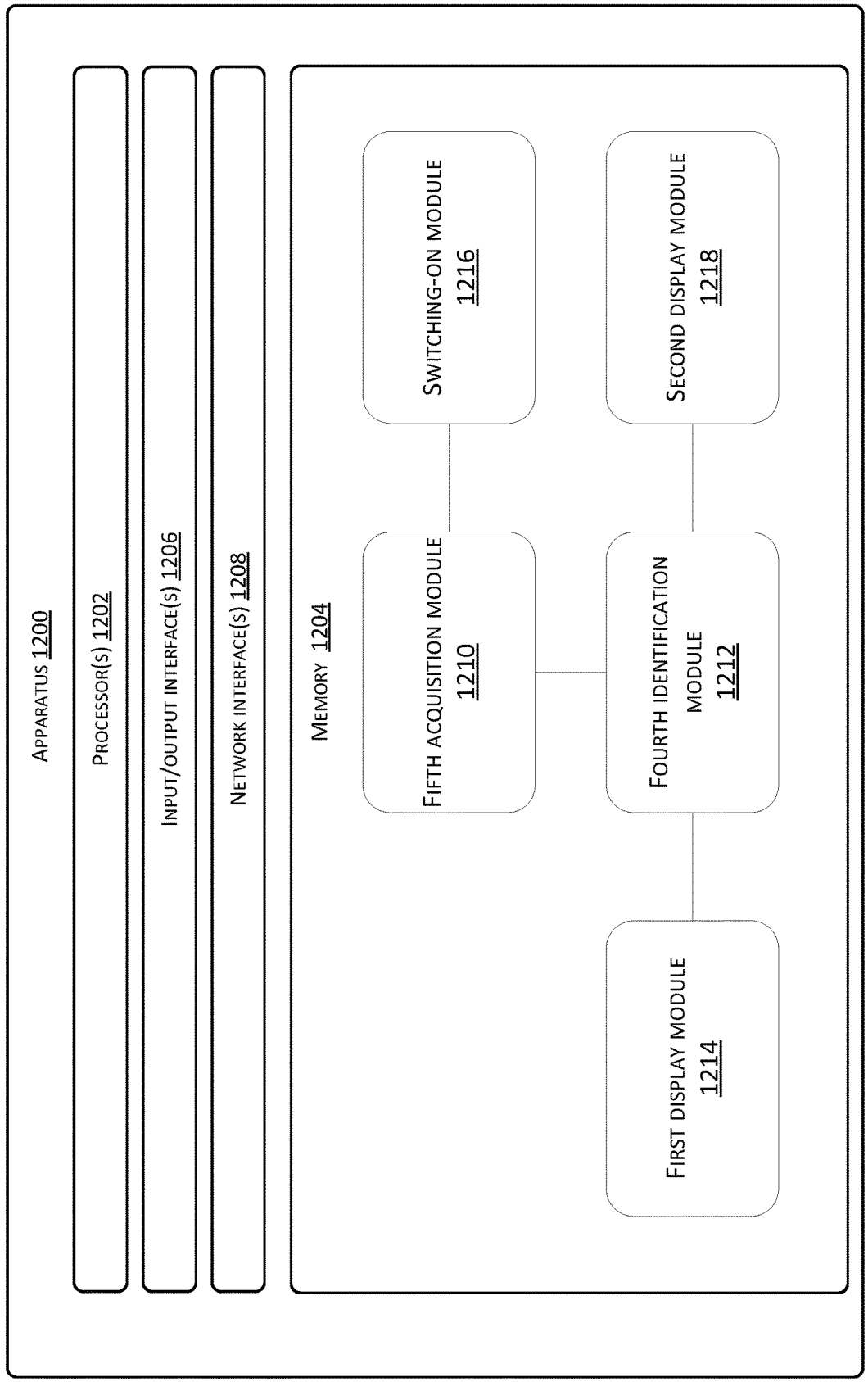
FIG. 12 is a schematic structural diagram of a role display apparatus provided in a twelfth embodiment of the present disclosure.

Referring to FIG. 12, it shows a schematic structural diagram of a role display apparatus provided in a twelfth embodiment of the present disclosure. As shown in FIG. 12, the apparatus 1200 includes one or more processor(s) 1202 or data processing unit(s) and memory 1204. The apparatus 1200 may further include one or more input/output interface(s) 1206 and one or more network interface(s) 1208. The memory 1204 is an example of computer-readable media.

The memory 1204 may store therein a plurality of modules or units including: a fifth acquisition module 1210, configured to acquire sound source angle data corresponding to a speech data frame of a role collected by a speech collection device; a fourth identification module 1212, configured to perform identification on the role based on the sound source angle data to obtain an identification result of the role; and a first display module 1214, configured to display identity data of the role on an interactive interface of the speech collection device based on the identification result of the role.

For example, in addition to the fifth acquisition module 1210, the apparatus 1200 further comprises the following module or unit stored in the memory 1204: a switching-on module 1216, configured to switch on lamps of the speech collection device in a sound source direction indicated by the sound source angle data.

For example, the apparatus 1200 further comprises the following module or unit stored in the memory 1204: a second display module 1218, configured to display speaking action images or speech waveform images of the role on the interactive interface of the speech collection device.

The role display apparatus provided in this embodiment is used for implementing the corresponding role display methods in the multiple method embodiments described above, and has the beneficial effects of the corresponding method embodiments, which will not be elaborated herein.

Figure 13:
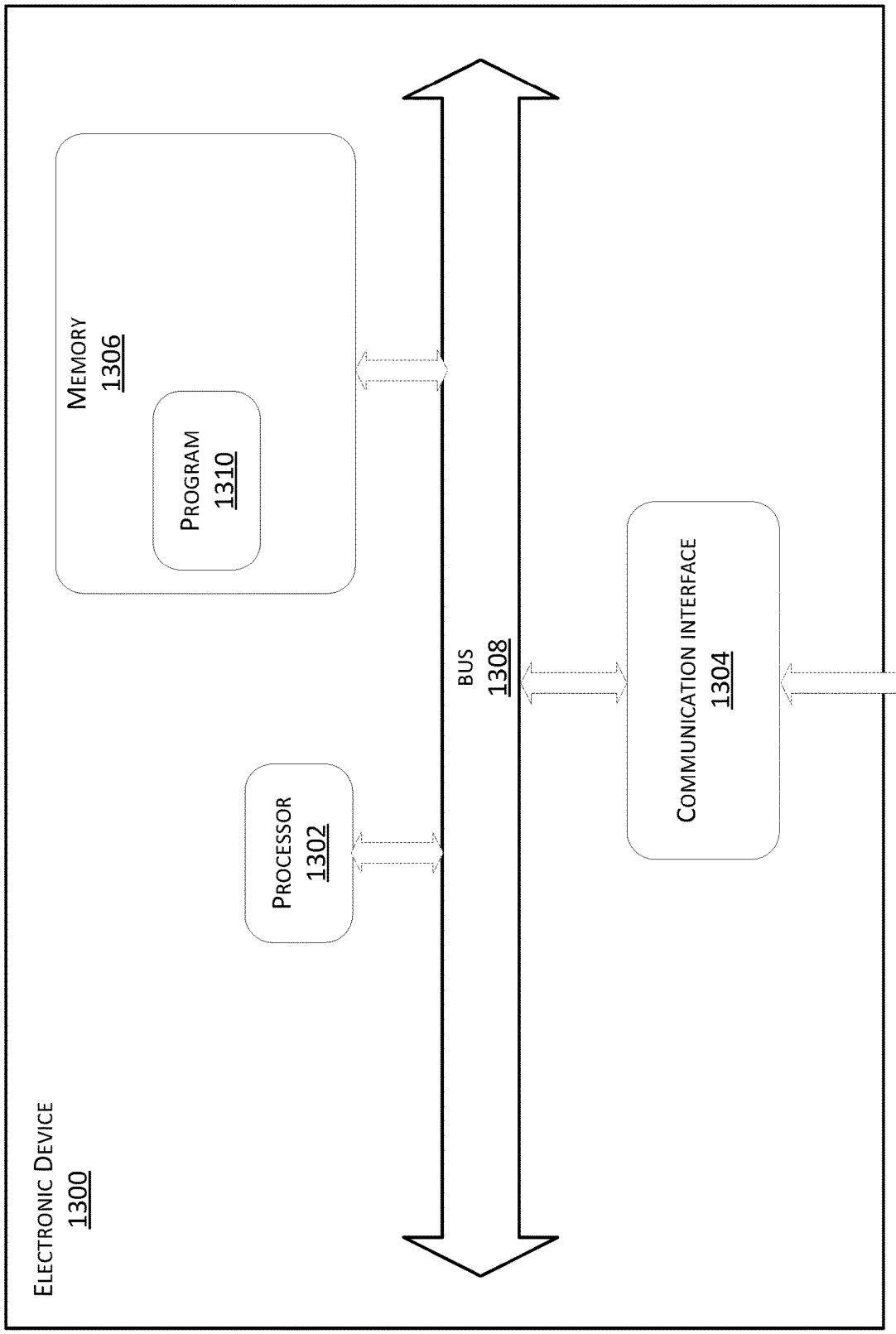
FIG. 13 is a schematic structural diagram of an electronic device provided in a thirteenth embodiment of the present disclosure.

Referring to FIG. 13, it shows a schematic structural diagram of an electronic device provided in a thirteenth embodiment of the present disclosure. The implementation manners of the electronic device are not limited by the embodiments of the present disclosure.

As shown in FIG. 13, the electronic device 1300 may comprise: a processor 1302, a communications interface 1304, a memory 1306, and a communications bus 1308.

Here, the processor 1302, the communications interface 1304, and the memory 1306 communicate with each other through the communications bus 1308.

The communications interface 1304 is configured to communicate with other electronic devices or servers.

The processor 1302 is configured to execute a program 1310, and for example may execute the relevant steps in the above-described role separation method embodiments.

For example, the program 1310 may include program codes, and the program codes include computer operation instructions.

The processor 1302 may be a central processing unit (CPU), or an application specific integrated circuit (ASIC), or one or more integrated circuits configured to implement the embodiments of the present disclosure. One or more processors included in a smart device may be the same type of processors, such as one or more CPUs; or may be different types of processors, such as one or more CPUs and one or more ASICs.

The memory 1306 is configured to store the program 1310. The memory 1306 may include a high-speed random-access memory (RAM), and may also include a non-volatile memory such as at least one disk memory.

The program 1310 can be configured to cause the processor 1302 to execute the following operations: acquire sound source angle data corresponding to a speech data frame of a to-be-separated role collected by a speech collection device; perform identification on the to-be-separated role based on the sound source angle data to obtain a first identification result of the to-be-separated role; and separate the role based on the first identification result of the to-be-separated role.

In an example implementation manner, the program 1310 is further configured to cause the processor 1302 to, after acquiring the sound source angle data corresponding to the speech data frame of the to-be-separated role collected by the speech collection device, perform voice activity detection on the speech data frame of the to-be-separated role to obtain a speech data frame with a voice activity; filter and smooth the speech data frame with the voice activity based on an energy spectrum of the speech data frame of the to-be-separated role to obtain a filtered and smoothed speech data frame; and update the sound source angle data based on the filtered and smoothed speech data frame to obtain updated sound source angle data.

In an example implementation manner, the program 1310 is further configured to cause the processor 1302 to, when filtering and smoothing the speech data frame with the voice activity based on an energy spectrum of the speech data frame of the to-be-separated role to obtain a filtered and smoothed speech data frame, filter and smooth the speech data frame with the voice activity through a median filter based on spectral flatness of the energy spectrum of the speech data frame of the to-be-separated role to obtain the filtered and smoothed speech data frame.

In an example implementation manner, the program 1310 is further configured to cause the processor 1302 to, when performing identification on the to-be-separated role based on the sound source angle data to obtain a first identification result of the to-be-separated role, perform sequence clustering on the sound source angle data to obtain a sequence clustering result of the sound source angle data; and determine that a role identifier corresponding to the sequence clustering result of the sound source angle data is the first identification result of the to-be-separated role.

In an example implementation manner, the program 1310 is further configured to cause the processor 1302 to, when performing sequence clustering on the sound source angle data to obtain a sequence clustering result of the sound source angle data, determine a distance between the sound source angle data and a sound source angle sequence clustering center; and determine the sequence clustering result of the sound source angle data based on the distance between the sound source angle data and the sound source angle sequence clustering center.

In an example implementation manner, the program 1310 is further configured to cause the processor 1302 to, after obtaining the first identification result of the to-be-separated role, perform voiceprint identification on a speech data frame of the to-be-separated role within a preset time period to obtain a second identification result of the to-be-separated role; and if the first identification result is different from the second identification result, use the second identification result to correct the first identification result to obtain a final identification result of the to-be-separated role.

In an example implementation manner, the speech collection device comprises a microphone array, and the program 1310 is further configured to cause the processor 1302 to, when acquiring the sound source angle data corresponding to the speech data frame of the to-be-separated role collected by the speech collection device, acquire a covariance matrix of the speech data frame received by at least some microphones in the microphone array; perform eigenvalue decomposition on the covariance matrix to obtain multiple eigenvalues; select a first quantity of largest eigenvalues from the multiple eigenvalues, and form a speech signal sub-space based on eigenvectors corresponding to the selected eigenvalues, wherein the first quantity is equivalent to an estimated quantity of sound sources; and determine the sound source angle data based on the speech signal sub-space.

In an example implementation manner, the program 1310 is further configured to cause the processor 1302 to, after obtaining the final identification result of the to-be-separated role, acquire face image data of the to-be-separated role collected by an image collection device; perform face recognition on the face image data to obtain a third identification result of the to-be-separated role; and if the third identification result is different from the second identification result, use the third identification result to correct the second identification result to obtain the final identification result of the to-be-separated role.

For the implementation of each step in the program 1310, reference may be made to the corresponding description of the corresponding step and unit in the above-described role separation method embodiments, which will not be elaborated herein. Those skilled in the art can clearly understand that, for the convenience and brevity of description, reference may be made to the corresponding process descriptions in the above-described method embodiments for the specific working process of the above-described devices and modules, which will not be elaborated here.

By the electronic device provided in this embodiment, acquire sound source angle data corresponding to a speech data frame of a to-be-separated role collected by a speech collection device; perform identification on the to-be-separated role based on the sound source angle data to obtain a first identification result of the to-be-separated role; and separate the to-be-separated role based on the first identification result of the to-be-separated role. By performing identification on the to-be-separated role based on the sound source angle data corresponding to the speech data frame of the to-be-separated role collected by the speech collection device, and separating the role based on the identification result of the to-be-separated role, it can separate the role in real time, thereby creating smoother user experiences than existing methods in the conventional techniques.

The program 1310 can be configured to cause the processor 1302 to execute the following operations: send to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role; and receive a separation result of the role sent by the cloud based on the role separation request.

For the implementation of each step in the program 1310, reference may be made to the corresponding description of the corresponding step and unit in the above-described role separation method embodiments, which will not be elaborated herein. Those skilled in the art can clearly understand that, for the convenience and brevity of description, reference may be made to the corresponding process descriptions in the above-described method embodiments for the specific working process of the above-described devices and modules, which will not be elaborated here.

By the electronic device provided in this embodiment, a speech collection device sends to a cloud a role separation request carrying a speech data frame of a to-be-separated role, the cloud acquires sound source angle data corresponding to the speech data frame based on the role separation request, performs identification on the to-be-separated role based on the sound source angle data, and separates the role based on an identification result of the to-be-separated role, and the speech collection device receives a separation result of the role sent by the cloud based on the role separation request. By performing identification on the to-be-separated role based on the sound source angle data corresponding to the speech data frame of the to-be-separated role carried by the role separation request, and separating the role based on the identification result of the to-be-separated role, it can separate the role in real time, thereby creating smoother user experiences than existing methods in the conventional techniques.

The program 1310 can be configured to cause the processor 1302 to execute the following operations: receive from a speech collection device a role separation request carrying a speech data frame of a to-be-separated role; acquire sound source angle data corresponding to the speech data frame based on the role separation request; perform identification on the to-be-separated role based on the sound source angle data to obtain an identification result of the to-be-separated role; and separate the role based on the identification result of the to-be-separated role, and send to the speech collection device a role separation result corresponding to the role separation request.

For the implementation of each step in the program 1310, reference may be made to the corresponding description of the corresponding step and unit in the above-described role separation method embodiments, which will not be elaborated herein. Those skilled in the art can clearly understand that, for the convenience and brevity of description, reference may be made to the corresponding process descriptions in the above-described method embodiments for the specific working process of the above-described devices and modules, which will not be elaborated here.

By the electronic device provided in this embodiment, a cloud receives from a speech collection device a role separation request carrying a speech data frame of a to-be-separated role, acquires sound source angle data corresponding to the speech data frame based on the role separation request, performs identification on the to-be-separated role based on the sound source angle data to obtain an identification result of the to-be-separated role, separates the role based on the identification result of the to-be-separated role, and finally sends to the speech collection device a separation result of the role corresponding to the role separation request. By performing identification on the to-be-separated role based on the sound source angle data corresponding to the speech data frame of the to-be-separated role carried by the role separation request, and separating the role based on the identification result of the to-be-separated role, it can separate the role in real time, thereby creating smoother user experiences than existing methods in the conventional techniques.

The program 1310 can be configured to cause the processor 1302 to execute the following operations: acquire sound source angle data corresponding to a speech data frame of a meeting role collected by a speech collection device disposed in a meeting room; perform identification on the meeting role based on the sound source angle data to obtain an identification result of the meeting role; and record meeting minutes of the meeting role based on the identification result of the meeting role.

For the implementation of each step in the program 1310, reference may be made to the corresponding description of the corresponding step and unit in the above-described meeting minutes recording method embodiments, which will not be elaborated herein. Those skilled in the art can clearly understand that, for the convenience and brevity of description, reference may be made to the corresponding process descriptions in the above-described method embodiments for the specific working process of the above-described devices and modules, which will not be elaborated here.

By the electronic device provided in this embodiment, acquire sound source angle data corresponding to a speech data frame of a meeting role collected by a speech collection device disposed in a meeting room; perform identification on the meeting role based on the sound source angle data to obtain an identification result of the meeting role; and record meeting minutes of the meeting role based on the identification result of the meeting role. By performing identification on the meeting role based on the sound source angle data corresponding to the speech data frame of the meeting role collected by the speech collection device disposed in the meeting room, and recording the meeting minutes of the meeting role based on the identification result of the meeting role, it can record the meeting minutes of the meeting role in real time, thereby effectively improving the efficiency of recording the meeting minutes of the meeting role compared with existing methods in the conventional techniques.

The program 1310 can be configured to cause the processor 1302 to execute the following operations: acquire sound source angle data corresponding to a speech data frame of a role collected by a speech collection device; perform identification on the role based on the sound source angle data to obtain an identification result of the role; and display identity data of the role on an interactive interface of the speech collection device based on the identification result of the role.

In an example implementation manner, the program 1310 is further configured to cause the processor 1302 to, after acquiring the sound source angle data corresponding to the speech data frame of the role collected by the speech collection device, switch on lamps of the speech collection device in a sound source direction indicated by the sound source angle data.

In an example implementation manner, the program 1310 is further configured to cause the processor 1302 to display speaking action images or speech waveform images of the role on the interactive interface of the speech collection device.

For the implementation of each step in the program 1310, reference may be made to the corresponding description of the corresponding step and unit in the above-described role display method embodiments, which will not be elaborated herein. Those skilled in the art can clearly understand that, for the convenience and brevity of description, reference may be made to the corresponding process descriptions in the above-described method embodiments for the specific working process of the above-described devices and modules, which will not be elaborated here.

By the electronic device provided in this embodiment, acquire sound source angle data corresponding to a speech data frame of a role collected by a speech collection device; perform identification on the role based on the sound source angle data to obtain an identification result of the role; and display identity data of the role on an interactive interface of the speech collection device based on the identification result of the role. By performing identification on the role based on the sound source angle data corresponding to the speech data frame of the role collected by the speech collection device, and displaying the identity data of the role on the interactive interface of the speech collection device based on the identification result of the role, it can display the identity data of the role in real time, thereby creating smoother user experiences than existing methods in the conventional techniques.

It should be noted that according to the needs of implementation, each component/step described in the embodiments of the present disclosure may be split into more components/steps, or two or more components/steps or some operations of components/steps may be combined into new components/steps to achieve the purpose of the embodiments of the present disclosure.

The above-described methods according to the embodiments of the present disclosure may be implemented in hardware, firmware, or implemented as software or computer codes that may be stored in a recording medium (such as CD ROMs, RAMs, floppy disks, hard disks, or magneto-optical disks), or implemented as computer codes downloaded over a network and originally stored in a remote recording medium or non-transitory machine-readable medium and to be stored in a local recording medium, so that the methods described herein can be processed by such software stored on a recording medium using a general-purpose computer, a special-purpose processor or programmable or dedicated hardware (such as ASICs or FPGAs). It can be understood that a computer, a processor, a microprocessor controller, or programmable hardware includes storage components (for example, RAMs, ROMs, flash memories, etc.) that can store or receive software or computer codes, and the software or computer codes, when accessed and executed by the computer, processor, or hardware, implement the role separation methods, the meeting minutes recording methods, or the role display methods described herein. Further, when a general-purpose computer accesses codes for implementing the role separation methods, the meeting minutes recording methods, or the role display methods described herein, the execution of the codes converts the general-purpose computer to a dedicated computer for performing the role separation methods, the meeting minutes recording methods, or the role display methods described herein.

Those of ordinary skill in the art can realize that the units and method steps of each example described in conjunction with the embodiments disclosed herein can be implemented in electronic hardware or a combination of computer software and electronic hardware. Whether these functions are performed in hardware or software depends on the application and design constraints of the technical solution. Those skilled in the art may implement the described functions using different methods for each application, but such implementation should not be considered to be beyond the scope of the embodiments of the present disclosure.

The above-described implementation manners are only used to illustrate the embodiments of the present disclosure, but not to limit the embodiments of the present disclosure. Those of ordinary skill in the art can also make various changes and modifications without departing from the spirit and scope of the embodiments of the present disclosure. Therefore, all equivalent technical solutions also belong to the scope of the embodiments of the present disclosure, and the scope of patent protection of the embodiments of the present disclosure should be defined by the claims.

The present disclosure may further be understood with clauses as follows.

Clause 1. A role separation method, comprising:
acquiring sound source angle data corresponding to a speech data frame of a to-be-separated role collected by a speech collection device;
performing identification on the to-be-separated role based on the sound source angle data to obtain a first identification result of the to-be-separated role; and
separating the role based on the first identification result of the to-be-separated role.

Clause 2. The method according to clause 1, wherein after the acquiring the sound source angle data corresponding to the speech data frame of the to-be-separated role collected by the speech collection device, the method further comprises:
performing voice activity detection on the speech data frame of the to-be-separated role to obtain a speech data frame with a voice activity;
filtering and smoothing the speech data frame with the voice activity based on an energy spectrum of the speech data frame of the to-be-separated role to obtain a filtered and smoothed speech data frame; and
updating the sound source angle data based on the filtered and smoothed speech data frame to obtain updated sound source angle data.

Clause 3. The method according to clause 2, wherein the filtering and smoothing the speech data frame with the voice activity based on the energy spectrum of the speech data frame of the to-be-separated role to obtain the filtered and smoothed speech data frame comprises:
filtering and smoothing the speech data frame with the voice activity through a median filter based on spectral flatness of the energy spectrum of the speech data frame of the to-be-separated role to obtain the filtered and smoothed speech data frame.

Clause 4. The method according to clause 1, wherein the performing the identification on the to-be-separated role based on the sound source angle data to obtain the first identification result of the to-be-separated role comprises:
performing sequence clustering on the sound source angle data to obtain a sequence clustering result of the sound source angle data; and
determining that a role identifier corresponding to the sequence clustering result of the sound source angle data is the first identification result of the to-be-separated role.

Clause 5. The method according to clause 4, wherein the performing the sequence clustering on the sound source angle data to obtain the sequence clustering result of the sound source angle data comprises:

determining a distance between the sound source angle data and a sound source angle sequence clustering center; and
determining the sequence clustering result of the sound source angle data based on the distance between the sound source angle data and the sound source angle sequence clustering center.

Clause 6. The method according to clause 1, wherein after the obtaining the first identification result of the to-be-separated role, the method further comprises:
performing voiceprint identification on a speech data frame of the to-be-separated role within a preset time period to obtain a second identification result of the to-be-separated role; and
if the first identification result is different from the second identification result, using the second identification result to correct the first identification result to obtain a final identification result of the to-be-separated role.

Clause 7. The method according to clause 1, wherein the speech collection device comprises a microphone array, and the acquiring the sound source angle data corresponding to the speech data frame of the to-be-separated role collected by the speech collection device further comprises:
acquiring a covariance matrix of the speech data frame received by at least some microphones in the microphone array;
performing eigenvalue decomposition on the covariance matrix to obtain multiple eigenvalues;
selecting a first quantity of largest eigenvalues from the multiple eigenvalues, and forming a speech signal sub-space based on eigenvectors corresponding to the selected eigenvalues, wherein the first quantity is equivalent to an estimated quantity of sound sources; and
determining the sound source angle data based on the speech signal sub-space.

Clause 8. The method according to clause 6, wherein after the obtaining the final identification result of the to-be-separated role, the method further comprises:
acquiring face image data of the to-be-separated role collected by an image collection device;
performing face recognition on the face image data to obtain a third identification result of the to-be-separated role; and
if the third identification result is different from the second identification result, using the third identification result to correct the second identification result to obtain the final identification result of the to-be-separated role.

Clause 9. A role separation method, comprising:
sending to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role; and
receiving a separation result of the role sent by the cloud based on the role separation request.

Clause 10. A role separation method, comprising:
receiving from a speech collection device a role separation request carrying a speech data frame of a to-be-separated role;
acquiring sound source angle data corresponding to the speech data frame based on the role separation request;

performing identification on the to-be-separated role based on the sound source angle data to obtain an identification result of the to-be-separated role; and separating the role based on the identification result of the to-be-separated role, and sending to the speech collection device a role separation result corresponding to the role separation request.

Clause 11. A meeting minutes recording method, comprising:

acquiring sound source angle data corresponding to a speech data frame of a meeting role collected by a speech collection device disposed in a meeting room;

performing identification on the meeting role based on the sound source angle data to obtain an identification result of the meeting role; and recording meeting minutes of the meeting role based on the identification result of the meeting role.

Clause 12. A role display method, comprising:

acquiring sound source angle data corresponding to a speech data frame of a role collected by a speech collection device;

performing identification on the role based on the sound source angle data to obtain an identification result of the role; and displaying identity data of the role on an interactive interface of the speech collection device based on the identification result of the role.

Clause 13. The method according to clause 12, wherein after the acquiring the sound source angle data corresponding to the speech data frame of the role collected by the speech collection device, the method further comprises:

switching on lamps of the speech collection device in a sound source direction indicated by the sound source angle data.

Clause 14. The method according to clause 12, further comprising:

displaying speaking action images or speech waveform images of the role on the interactive interface of the speech collection device.

Clause 15. A role separation apparatus, comprising:

a first acquisition module, configured to acquire sound source angle data corresponding to a speech data frame of a to-be-separated role collected by a speech collection device;

a first identification module, configured to perform identification on the to-be-separated role based on the sound source angle data to obtain a first identification result of the to-be-separated role; and a separation module, configured to separate the to-be-separated role based on the first identification result of the to-be-separated role.

Clause 16. A role separation apparatus, comprising:

a first sending module, configured to send to a cloud a role separation request carrying a speech data frame of a to-be-separated role, so that the cloud acquires sound source angle data corresponding to the speech data frame based on the role separation request, performs identification on the to-be-separated role based on the sound source angle data, and separates the role based on an identification result of the to-be-separated role; and a first receiving module, configured to receive a separation result of the role sent by the cloud based on the role separation request.

Clause 17. A role separation apparatus, comprising:

a second receiving module, configured to receive from a speech collection device a role separation request carrying a speech data frame of a to-be-separated role;

a third acquisition module, configured to acquire sound source angle data corresponding to the speech data frame based on the role separation request;

a second identification module, configured to perform identification on the to-be-separated role based on the sound source angle data to obtain an identification result of the to-be-separated role; and a second sending module, configured to separate the role based on the identification result of the to-be-separated role, and send to the speech collection device a role separation result corresponding to the role separation request.

Clause 18. A meeting minutes recording apparatus, comprising:

a fourth acquisition module, configured to acquire sound source angle data corresponding to a speech data frame of a meeting role collected by a speech collection device disposed in a meeting room;

a third identification module, configured to perform identification on the meeting role based on the sound source angle data to obtain an identification result of the meeting role; and a recording module, configured to record meeting minutes of the meeting role based on the identification result of the meeting role.

Clause 19. A role display apparatus, comprising:

a fifth acquisition module, configured to acquire sound source angle data corresponding to a speech data frame of a role collected by a speech collection device;

a fourth identification module, configured to perform identification on the role based on the sound source angle data to obtain an identification result of the role; and a first display module, configured to display identity data of the role on an interactive interface of the speech collection device based on the identification result of the role.

Clause 20. An electronic device, comprising: a processor, a memory, a communications interface, and a communications bus, wherein the processor, the memory, and the communications interface communicate with each other through the communications bus;

the memory is configured to store at least one executable instruction that causes the processor to execute an operation corresponding to the role separation method according to any one of clauses 1-8, or an operation corresponding to the role separation method according to clause 9, or an operation corresponding to the role separation method according to clause 10, or an operation corresponding to the meeting minutes recording method according to clause 11, or an operation corresponding to the role display method according to any one of clauses 12-14.

Clause 21. A computer storage medium having a computer program stored thereon, wherein the program, when executed by a processor, is caused to implement the role separation method according to any one of clauses 1-8, or the role separation method according to clause 9, or the role separation method according to clause 10, or the meeting minutes recording method according to clause 11, or the role display method according to any one of clauses 12-14.

What is claimed is:

1. A method comprising:
   acquiring sound source angle data corresponding to a speech data frame of a to-be-separated role collected by a speech collection device, the speech collection device including a microphone array, the acquiring the sound source angle data corresponding to the speech data frame of the to-be-separated role collected by the speech collection device including:
      acquiring a covariance matrix of the speech data frame received by at least some microphones in the microphone array;
      performing eigenvalue decomposition on the covariance matrix to obtain multiple eigenvalues;
      selecting a first quantity of largest eigenvalues from the multiple eigenvalues, and forming a speech signal sub-space based on eigenvectors corresponding to the selected eigenvalues; and
      determining the sound source angle data based on the speech signal sub-space;
   performing identification on the to-be-separated role based on the sound source angle data to obtain a first identification result of the to-be-separated role; and
   separating a role based on the first identification result of the to-be-separated role.

2. The method according to claim 1, wherein after the acquiring the sound source angle data corresponding to the speech data frame of the to-be-separated role collected by the speech collection device, the method further comprises:
   performing voice activity detection on the speech data frame of the to-be-separated role to obtain a speech data frame with a voice activity;
   filtering and smoothing the speech data frame with the voice activity based on an energy spectrum of the speech data frame of the to-be-separated role to obtain a filtered and smoothed speech data frame; and
   updating the sound source angle data based on the filtered and smoothed speech data frame to obtain updated sound source angle data.

3. The method according to claim 2, wherein the filtering and smoothing the speech data frame with the voice activity based on the energy spectrum of the speech data frame of the to-be-separated role to obtain the filtered and smoothed speech data frame comprises:
   filtering and smoothing the speech data frame with the voice activity through a median filter based on a spectral flatness of the energy spectrum of the speech data frame of the to-be-separated role to obtain the filtered and smoothed speech data frame.

4. The method according to claim 1, wherein the performing the identification on the to-be-separated role based on the sound source angle data to obtain the first identification result of the to-be-separated role comprises:
   performing sequence clustering on the sound source angle data to obtain a sequence clustering result of the sound source angle data; and
   determining that a role identifier corresponding to the sequence clustering result of the sound source angle data is the first identification result of the to-be-separated role.

5. The method according to claim 4, wherein the performing the sequence clustering on the sound source angle data to obtain the sequence clustering result of the sound source angle data comprises:
   determining a distance between the sound source angle data and a sound source angle sequence clustering center; and
   determining the sequence clustering result of the sound source angle data based on the distance between the sound source angle data and the sound source angle sequence clustering center.

6. The method according to claim 1, wherein after the obtaining the first identification result of the to-be-separated role, the method further comprises:
   performing voiceprint identification on a speech data frame of the to-be-separated role within a preset time period to obtain a second identification result of the to-be-separated role; and
   in response to determining that the first identification result is different from the second identification result, using the second identification result to correct the first identification result to obtain a final identification result of the to-be-separated role.

7. The method according to claim 1, wherein the first quantity is equivalent to an estimated quantity of sound sources.

8. The method according to claim 6, wherein after the obtaining the final identification result of the to-be-separated role, the method further comprises:
   acquiring face image data of the to-be-separated role collected by an image collection device;
   performing face recognition on the face image data to obtain a third identification result of the to-be-separated role; and
   in response to determining that the third identification result is different from the second identification result, using the third identification result to correct the second identification result to obtain the final identification result of the to-be-separated role.

9. An apparatus comprising:
   one or more processors; and
   one or more memories storing thereon computer-readable instructions that, executable by the one or more processors, cause the one or more processors to perform acts comprising:
      acquiring sound source angle data corresponding to a speech data frame of a role collected by a speech collection device, the speech collection device including a microphone array, the acquiring the sound source angle data corresponding to the speech data frame of the role collected by the speech collection device including:
         acquiring a covariance matrix of the speech data frame received by at least some microphones in the microphone array;
         performing eigenvalue decomposition on the covariance matrix to obtain multiple eigenvalues;
         selecting a first quantity of largest eigenvalues from the multiple eigenvalues, and forming a speech signal sub-space based on eigenvectors corresponding to the selected eigenvalues; and
         determining the sound source angle data based on the speech signal sub-space;
      performing identification on the role based on the sound source angle data to obtain a first identification result of the role; and
      displaying identity data of the role on an interactive interface of the speech collection device based on the first identification result of the role.

10. The apparatus according to claim 9, wherein after the acquiring the sound source angle data corresponding to the speech data frame of the role collected by the speech collection device, the acts further comprise:

switching on a lamp of the speech collection device in a sound source direction indicated by the sound source angle data.

11. The apparatus according to claim 9, wherein the acts further comprise:
displaying a speaking action image or a speech waveform image of the role on the interactive interface of the speech collection device.

12. The apparatus according to claim 9, wherein the acts further comprise:
performing voiceprint identification on the speech data frame within a preset time period to obtain a second identification result; and
in response to determining that the first identification result is different from the second identification result, using the second identification result to correct the first identification result to obtain a final identification result of the role.

13. The apparatus according to claim 12, wherein after the obtaining the final identification result of the role, the acts further comprise:
acquiring face image data of the role collected by an image collection device;
performing face recognition on the face image data to obtain a third identification result of the role; and
in response to determining that the third identification result is different from the second identification result, using the third identification result to correct the second identification result to obtain the final identification result of the role.

14. The apparatus according to claim 12, wherein the acts further comprise displaying identity data of the role on the interactive interface of the speech collection device based on the final identification result of the role.

15. One or more memories storing thereon computer-readable instructions that, executable by one or more processors, cause the one or more processors to perform acts comprising:
acquiring sound source angle data corresponding to a speech data frame of a to-be-separated role collected by a speech collection device;
performing identification on the to-be-separated role based on the sound source angle data to obtain a first identification result of the to-be-separated role;
performing voiceprint identification on the speech data frame of the to-be-separated role within a preset time period to obtain a second identification result of the to-be-separated role;
in response to determining that the first identification result is different from the second identification result, using the second identification result to correct the first identification result;
acquiring face image data of the to-be-separated role collected by an image collection device;
performing face recognition on the face image data to obtain a third identification result of the to-be-separated role;
in response to determining that the third identification result is different from the second identification result, using the third identification result to correct the second identification result to obtain a final identification result of the to-be-separated role; and
separating a role based on the final identification result of the to-be-separated role.

16. The one or more memories according to claim 15, wherein after the acquiring the sound source angle data corresponding to the speech data frame of the to-be-separated role collected by the speech collection device, the acts further comprise:
performing voice activity detection on the speech data frame of the to-be-separated role to obtain a speech data frame with a voice activity;
filtering and smoothing the speech data frame with the voice activity based on an energy spectrum of the speech data frame of the to-be-separated role to obtain a filtered and smoothed speech data frame; and
updating the sound source angle data based on the filtered and smoothed speech data frame to obtain updated sound source angle data.

17. The one or more memories according to claim 16, wherein the filtering and smoothing the speech data frame with the voice activity based on the energy spectrum of the speech data frame of the to-be-separated role to obtain the filtered and smoothed speech data frame comprises:
filtering and smoothing the speech data frame with the voice activity through a median filter based on a spectral flatness of the energy spectrum of the speech data frame of the to-be-separated role to obtain the filtered and smoothed speech data frame.

18. The one or more memories according to claim 15, wherein the performing the identification on the to-be-separated role based on the sound source angle data to obtain the first identification result of the to-be-separated role comprises:
performing sequence clustering on the sound source angle data to obtain a sequence clustering result of the sound source angle data; and
determining that a role identifier corresponding to the sequence clustering result of the sound source angle data is the first identification result of the to-be-separated role.

19. The one or more memories according to claim 18, wherein the performing the sequence clustering on the sound source angle data to obtain the sequence clustering result of the sound source angle data comprises:
determining a distance between the sound source angle data and a sound source angle sequence clustering center; and
determining the sequence clustering result of the sound source angle data based on the distance between the sound source angle data and the sound source angle sequence clustering center.

20. The one or more memories according to claim 15, wherein:
the speech collection device comprises a microphone array; and
the acquiring the sound source angle data corresponding to the speech data frame of the to-be-separated role collected by the speech collection device comprises:
acquiring a covariance matrix of the speech data frame received by at least some microphones in the microphone array;
performing eigenvalue decomposition on the covariance matrix to obtain multiple eigenvalues;
selecting a first quantity of largest eigenvalues from the multiple eigenvalues, and forming a speech signal sub-space based on eigenvectors corresponding to the selected eigenvalues; and
determining the sound source angle data based on the speech signal sub-space.

* * * * *